(12) United States Patent
Hamed

(10) Patent No.: US 11,787,504 B2
(45) Date of Patent: Oct. 17, 2023

(54) REAR DERAILLEUR ELECTRICAL ACTUATOR

(71) Applicant: Hazem Nihad Hamed, Los Angeles, CA (US)

(72) Inventor: Hazem Nihad Hamed, Los Angeles, CA (US)

( * ) Notice: Subject to any disclaimer, the term of this patent is extended or adjusted under 35 U.S.C. 154(b) by 0 days.

(21) Appl. No.: 18/109,786

(22) Filed: Feb. 14, 2023

(65) Prior Publication Data

US 2023/0278666 A1 Sep. 7, 2023

(51) Int. Cl.
*B62M 9/122* (2010.01)
*B62M 9/123* (2010.01)
*B62M 9/125* (2010.01)
*B62M 9/128* (2010.01)

(52) U.S. Cl.
CPC ............ *B62M 9/122* (2013.01); *B62M 9/123* (2013.01); *B62M 9/125* (2013.01); *B62M 9/128* (2013.01)

(58) Field of Classification Search
CPC ...... B62M 25/08; B62M 9/132; B62M 9/122; B62M 9/124; B62M 6/45
USPC ...................................................... 474/80, 82
See application file for complete search history.

(56) References Cited

U.S. PATENT DOCUMENTS

| | | | | |
|---|---|---|---|---|
| 5,729,067 A * | 3/1998 | Janutka | ................. | H02P 25/034 310/12.32 |
| 5,874,818 A * | 2/1999 | Schuurman | ......... | H02P 23/0077 318/599 |
| 6,208,497 B1 * | 3/2001 | Seale | ..................... | H02K 41/03 361/160 |
| 6,676,549 B1 * | 1/2004 | Fukuda | .................. | B62J 45/412 474/82 |
| 7,549,662 B2 * | 6/2009 | Righi | ..................... | B62M 9/124 474/82 |
| 7,761,212 B2 * | 7/2010 | Takebayashi | ......... | H04L 12/403 482/57 |
| 8,655,561 B2 * | 2/2014 | Kitamura | ............... | B62K 23/06 701/51 |
| 8,909,424 B2 * | 12/2014 | Jordan | .................. | B62M 9/132 701/51 |
| 9,334,017 B2 * | 5/2016 | Sala | ........ | B62M 9/122 |
| 9,394,030 B2 * | 7/2016 | Shipman | ................ | B62M 25/08 |
| 9,491,788 B1 * | 11/2016 | Kasai | ...................... | H04W 4/80 |
| 9,540,071 B2 * | 1/2017 | Jordan | .................. | B62K 23/02 |
| 9,656,723 B1 * | 5/2017 | Tachibana | .............. | B62M 9/122 |
| 9,676,444 B2 * | 6/2017 | Shipman | ................ | B62M 25/08 |
| 9,682,744 B2 * | 6/2017 | Watarai | .................. | B62M 25/08 |
| 9,802,669 B2 * | 10/2017 | Jordan | ..................... | B62J 45/41 |
| 10,239,579 B2 * | 3/2019 | Pasqua | .................. | B62M 9/122 |
| 10,640,171 B2 * | 5/2020 | Hamed | ..................... | B62J 50/22 |
| 10,668,982 B2 * | 6/2020 | Miglioranza | ........... | H02P 21/22 |
| 10,773,773 B2 * | 9/2020 | Komatsu | ................ | B62M 25/08 |
| 10,793,222 B1 * | 10/2020 | Harris | .................. | B62M 9/1244 |
| 11,230,349 B2 * | 1/2022 | Liao | ...................... | B62M 9/1242 |
| 11,299,239 B2 * | 4/2022 | Komatsu | ................ | B62M 9/122 |

(Continued)

*Primary Examiner* — Henry Y Liu

(57) ABSTRACT

An electrical actuator for a bicycle rear derailleur making use of a standard wireless remote control (RC) servo unit relying exclusively on highly efficient spur gearing reduction and facilitating highly accurate derailleur positioning thereof through an integral digital magnetic rotary encoder with assembly thereof sealed in a two-piece housing with a lateral extension for an auxiliary spur gear serving to transmit actuation effort thereof to actuation shaft of a rear derailleur.

20 Claims, 15 Drawing Sheets

(56) References Cited

U.S. PATENT DOCUMENTS

| | | | |
|---|---|---|---|
| 11,420,710 B2* | 8/2022 | Shipman | B62M 9/124 |
| 11,498,643 B2* | 11/2022 | Mizutani | B62J 43/30 |
| 11,535,338 B2* | 12/2022 | Sala | G01D 5/145 |
| 11,535,339 B2* | 12/2022 | Ichida | B62M 9/122 |
| 11,554,832 B2* | 1/2023 | Fujimoto | B62M 25/08 |
| 11,560,200 B2* | 1/2023 | Sala | B62M 9/122 |
| 11,565,771 B2* | 1/2023 | Boehm | B62M 25/08 |
| 11,566,702 B2* | 1/2023 | Chuang | F16H 61/0213 |
| 11,584,478 B2* | 2/2023 | Shahana | B62M 25/08 |
| 11,597,470 B2* | 3/2023 | Kondo | B62J 99/00 |
| 11,597,471 B2* | 3/2023 | Shahana | B62J 45/412 |
| 11,608,139 B2* | 3/2023 | Komatsu | B62M 9/125 |
| 11,618,532 B2* | 4/2023 | Jordan | B62L 3/02 474/80 |
| 11,623,713 B2* | 4/2023 | Shahana | B62M 6/45 180/206.2 |
| 2001/0011809 A1* | 8/2001 | Fukuda | B62M 9/122 280/11.36 |
| 2001/0043450 A1* | 11/2001 | Seale | H02N 15/00 361/160 |
| 2003/0207732 A1* | 11/2003 | Fukuda | B62M 9/122 474/82 |
| 2004/0102269 A1* | 5/2004 | Fukuda | B62M 25/08 474/70 |
| 2005/0187050 A1* | 8/2005 | Fukuda | B62M 25/08 474/82 |
| 2005/0239587 A1* | 10/2005 | Ichida | B62M 9/122 474/82 |
| 2006/0071622 A1* | 4/2006 | Townsend | H02K 11/05 318/400.31 |
| 2008/0227572 A1* | 9/2008 | Sakaue | B62M 9/122 474/82 |
| 2009/0215561 A1* | 8/2009 | Fukuda | B62M 9/122 474/82 |
| 2014/0358386 A1* | 12/2014 | Cracco | B62M 9/122 701/51 |
| 2015/0111675 A1* | 4/2015 | Shipman | B62M 9/122 474/82 |
| 2016/0339986 A1* | 11/2016 | Jordan | G08C 17/02 |
| 2018/0029668 A1* | 2/2018 | Miglioranza | H02P 6/06 |
| 2018/0178881 A1* | 6/2018 | Miglioranza | B62M 9/122 |
| 2018/0180640 A1* | 6/2018 | Miglioranza | G01P 3/488 |
| 2018/0188707 A1* | 7/2018 | Xiong | G05B 19/23 |
| 2018/0237104 A1* | 8/2018 | Pasqua | B62M 9/125 |
| 2019/0291816 A1* | 9/2019 | Komatsu | B62K 25/30 |
| 2020/0189688 A1* | 6/2020 | Rodgers | B62M 9/1242 |
| 2020/0269954 A1* | 8/2020 | Mizutani | B62M 9/128 |
| 2021/0070396 A1* | 3/2021 | Garcia | B62M 9/125 |
| 2021/0129937 A1* | 5/2021 | Sala | H02J 7/02 |
| 2022/0388604 A1* | 12/2022 | Zubieta Andueza | B62M 9/125 |
| 2022/0411017 A1* | 12/2022 | Braedt | B62M 9/16 |

* cited by examiner

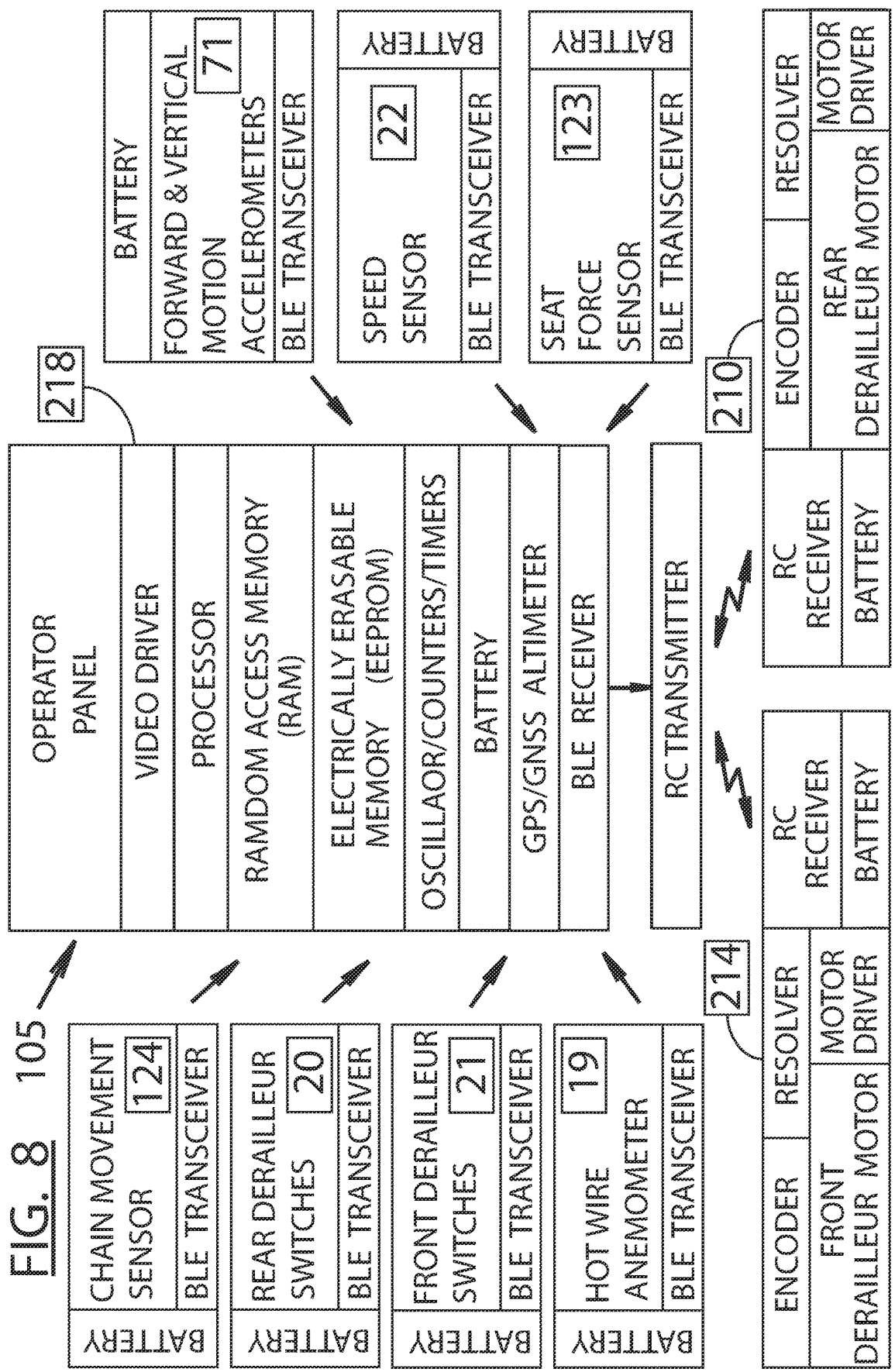

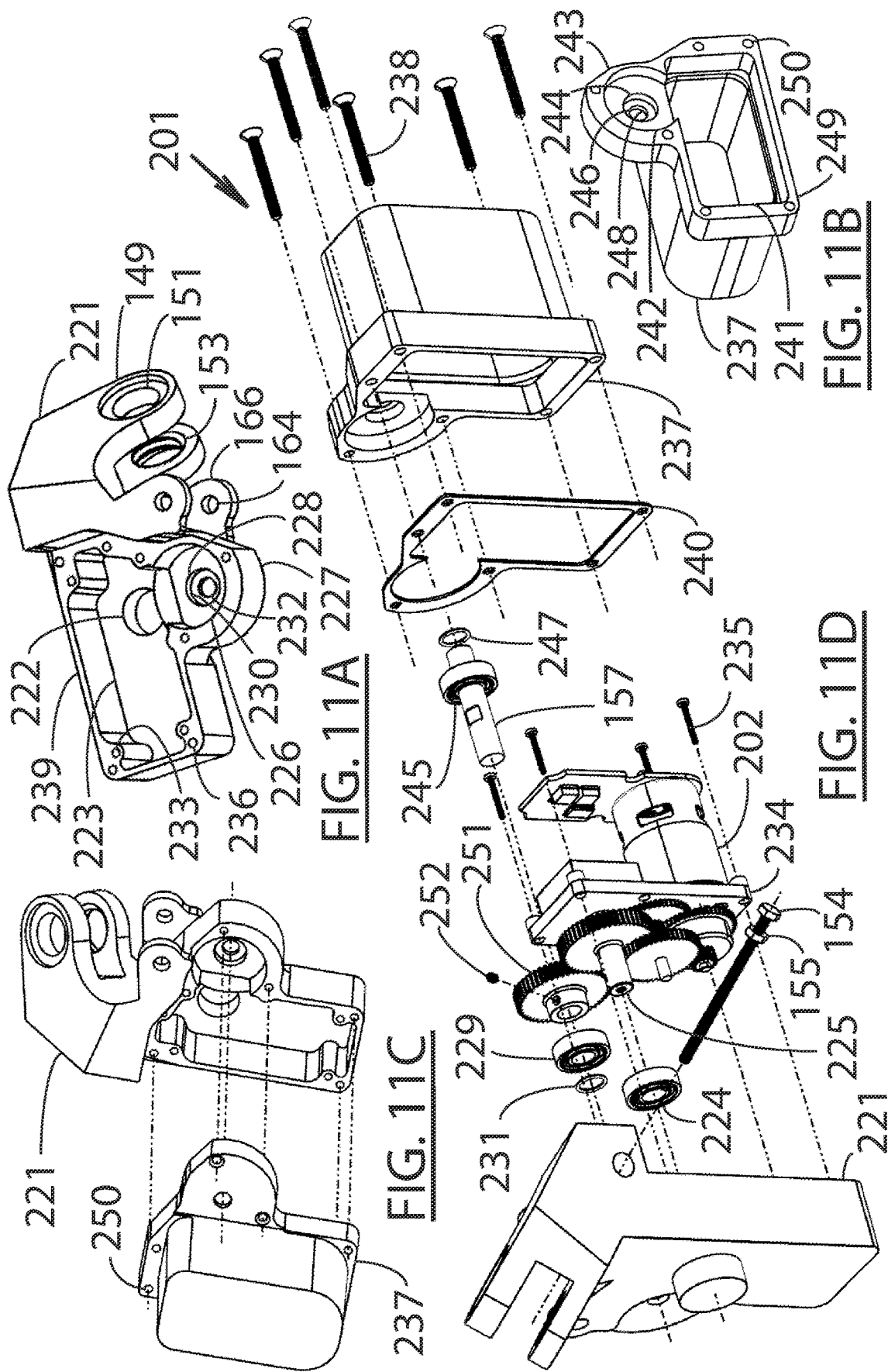

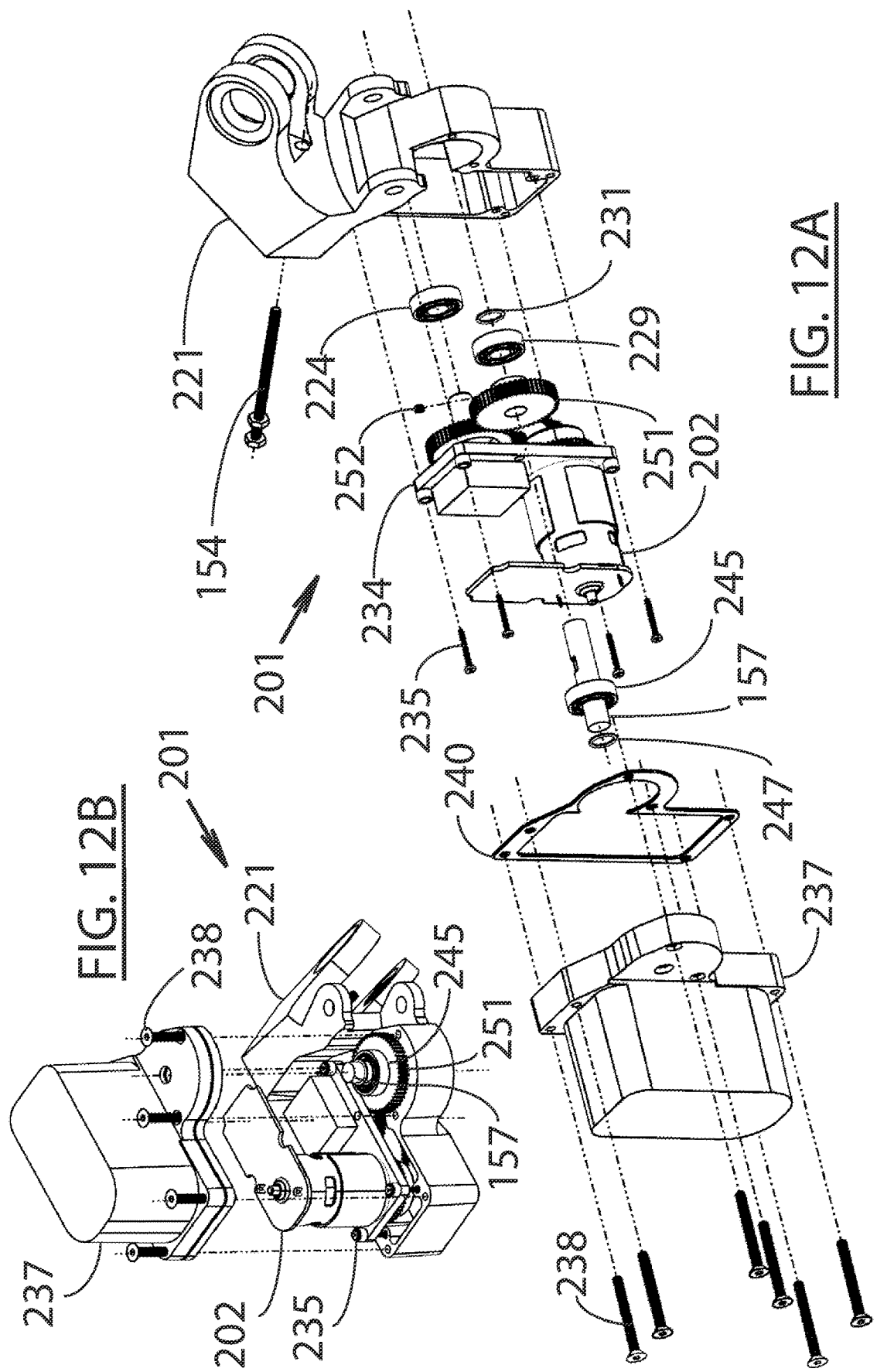

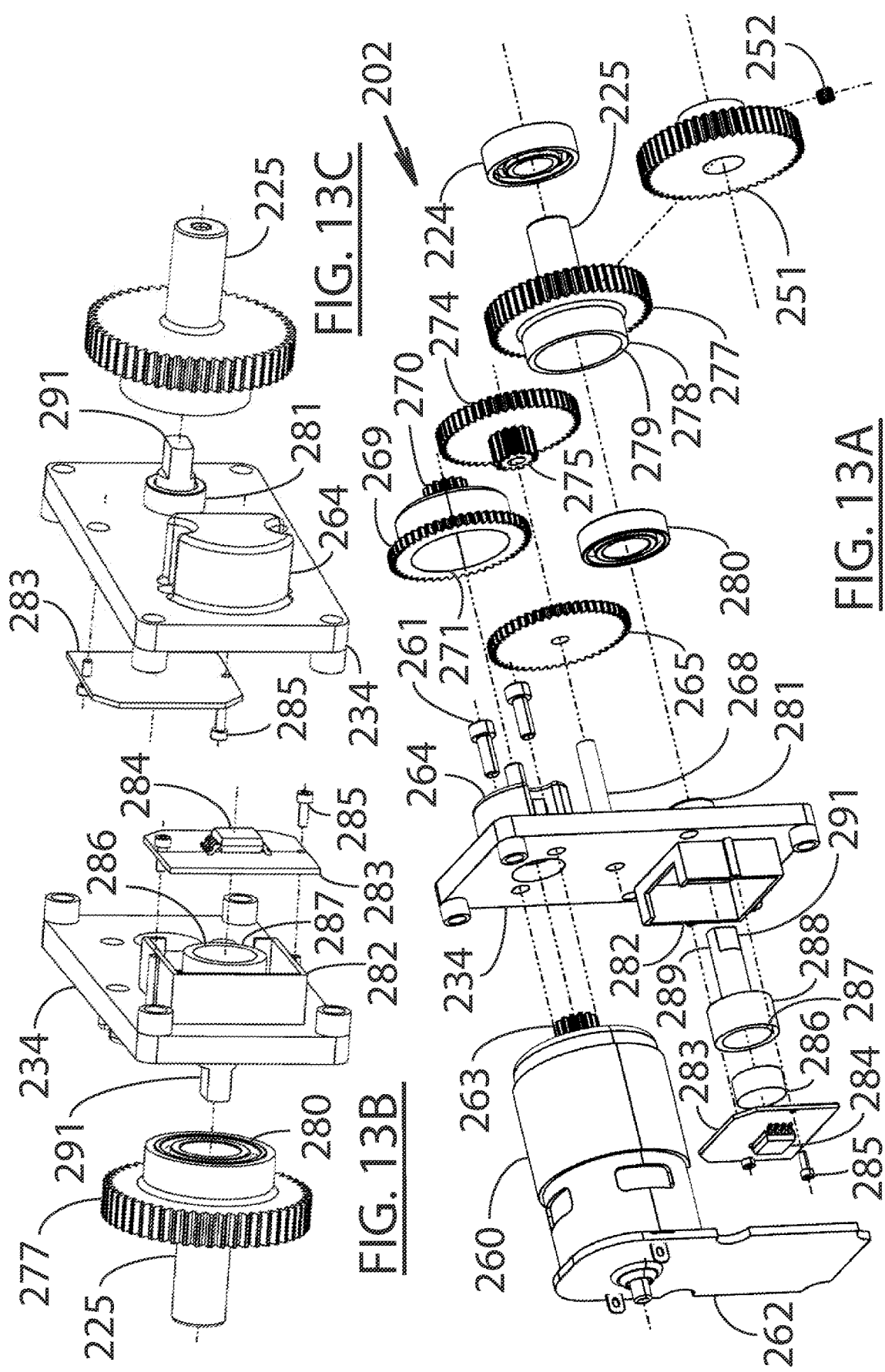

REAR DERAILLEUR ELECTRICAL ACTUATOR

CROSS-REFERENCE TO RELATED APPLICATIONS

Not Applicable

FEDERALLY SPONSORED RESEARCH

Not Applicable

SEQUENCE LISTING OR PROGRAM

Not Applicable

FIELD OF THE INVENTION

The disclosed invention relates to the cycling transportation and sporting industry, specifically to modern bicycle designs typically making use of front and rear powered drive chain derailleurs serving to alternate drive chain position between different ratio front and rear drive sprockets through wiring to a set of rider control switches, thereby permitting the rider to achieve an optimal drivetrain ratio through selection of an adequate combination of front and rear drive sprockets, thereby facilitating a comfortable pedaling rate and effort thereof depending on desired road speed, rider conditioning, road inclination and other circumstantial conditions.

BACKGROUND OF THE INVENTION

Bicycles have existed for many years serving throughout as transportation and sporting means. Over the great time span since their inception, the technology has evolved with numerous designs and advancements predominantly geared toward addressing rider comfort. With the initial designs from many years ago comprising a single speed power transmission mechanism often requiring the rider to either exert undue effort on the pedals or have to alternate the pedals at an uncomfortably high rate to achieve desired riding speed, a need was recognized for multiple powertrain ratios to facilitate acceptable operator pedaling rates and efforts. A variety of designs consequently emerged where additional power transmission sprockets of various number of teeth but equal pitch were added in the axial directions of the pedals mechanism as well as power transmission rear wheel to facilitate a combination of front and rear power transmission ratios resulting in optimal settings based on desired bicycle speeds, road conditions, operator biometrics and preference. This innovation was facilitated by the defacto standard four bar linkage mechanism based derailleur assembly used to this very day to alternate drive sprockets through properly positioning the drive chain thereto as well as compensate for resultant varying chain lengths through an integral spring loaded chain tensioning mechanism. The capability was facilitated by two cable tensioning apparatuses, one for rear sprockets and another for the fronts. With one end of each cable apparatus connected to the derailleur chain positioning mechanism and the other end to an operator actuation mechanism typically comprising a lever assembly, this apparatus granted the operator the ability to alternate the chain position in the axial position for proper alignment and thereby engagement of selected rear and front drive sprockets in order to achieve optimal power transmission ratio settings. Advancements in the actuation mechanism included indexing capability of the operator lever assembly so that the actuation of the gearing mechanism takes place in an indexing fashion consistently properly aligning the chain with desired sprocket thereof rather than one continuous motion requiring the operator to guess the proper chain position often leading to positioning errors.

Most recent developments stemming from desire to eliminate shifting cables altogether and additionally replacing operator actuation efforts of the shifter mechanisms with switching devices controlling powered derailleurs, resulted in incorporation of small DC motors acting through typically a worm and spur gearset to drive the derailleur mechanisms through actuation of one of the joints of their four bar linkages, equally applicable to both rear as well as front derailleurs.

As most of these recent designs need to achieve a substantial gearing reduction ratio to amplify the output torque of their fairly small motors to an operational level, they almost exclusively rely on multiple stage proprietary gearing reduction sets making use of at least one worm gearset stage directly realizing the needed substantial reduction but at the cost of diminished efficiency to around 70% for the wormset stage due to the sliding motion between the worm and the worm gear. With their second, third and often fourth stage relying on pure spur gearing strictly based on rolling motions, these later reduction stages achieve substantially higher power transmission efficiencies, typically in the neighborhood of 95% plus per stage.

Consequentially, the typical efficiency range of electrical derailleur reduction gearsets is in the $60^{th}$ percentile neighborhood, simply derived by the product of efficiencies of all stages, leading to oversized motors and higher drain on powering circuits and batteries typically leading to premature componentry wear for most of these commercially available derailleurs.

DISCUSSION OF PRIOR ART

The following is a brief summary of prior art deemed pertinent to the bicycle derailleur electrical actuator of the present invention.

U.S. Pat. No. 11,535,338 B2 discloses an electronic rear derailleur making use of a proprietary geared reduction unit for actuation thereof making use of a first stage worm gearing notwithstanding lower efficiency due to sliding motion between the worm and worm gear leading to higher battery drain, increased motor load and heat generation and thereby shorter componentry life.

U.S. Pat. No. 11,472,509 B2 discloses an electronic rear derailleur making use of a proprietary geared reduction unit for actuation thereof making use of a second stage worm gearing set notwithstanding the lower overall efficiency, being the product of efficiencies of all reduction stages, stemming from the worm gearing stage, thereby leading to higher battery drain, increased motor load and heat generation and thereby shorter componentry life.

U.S. Pat. No. 10,981,625 B2 discloses an electronic rear derailleur making use of a clutch member used to disengage gear train in case of an exterior loading condition. As it is clear the intent of this arrangement is to prevent overload to the gear train in case of an impossible shift due to lack of a chain forward movement, the solution is pursued in lieu of a chain movement sensing apparatus to prevent the resultant overload condition.

U.S. Pat. No. 9,676,444 B2 discloses an electronic rear derailleur making use of a breakaway mechanism to protect gearing in case of a crash or side impact to the rear derailleur. This problem is additionally compounded by a mechanically locked gearing mechanism due to thereof implementation of a worm gearing set with no back drive capability. Although some protection of the rear derailleur mechanism is thereby achievable, the protection takes place at the expense of a damaged chain due to thereof engagement between the rear derailleur caging assembly and a fixed sprocket.

Notwithstanding the extensive endeavor in the art, a standard high efficiency rear derailleur actuator apparatus entailing additional highly desirable characteristics such as built-in overload protection, minimal weight and a fast response time remains elusive.

BRIEF SUMMARY OF THE INVENTION

Equally applicable to both front and rear bicycle electrical derailleurs, inventor discloses an actuating gearbox apparatus comprising a widely available high efficiency standard reduction transmission package typically used in wireless remote control (RC) servo units thoroughbred for great space and weight savings, exclusively relying on spur gearing and with on-board electronics serving to directly interpret a pulse width modulated signal to power a directly coupled small cored or coreless DC motor acting through a triple or quadruple spur gearing reduction set with output shaft thereof coupled to a magnetic 12-bit quadrature encoder for high positioning accuracy. In the foregoing rear derailleur implementation, acceptable packaging necessitated connection of output gear of target standard remote control (RC) servo mechanism to an auxiliary gear serving to power gearbox output shaft retained between two anti-friction bearings and internal o'rings, all tightly packed in a sealed two piece cast aluminum housing.

A further iteration of the disclosed invention comprises a digitally commutated brushless AC motor, also available as standard off the shelf wireless remote control (RC) servo componentry, in lieu of the brushed DC motor, with integral on board electronics resulting in greatly improved response time, greater endurance due to elimination of motor brushes and higher efficiency thereof for substantially improved power conservation and minimal heat losses.

An alternate design serving to eliminate the auxiliary output gear and couple the standard wireless remote control (RC) servo output shaft directly to the derailleur mechanism does result in minimized gearing backlash, nonetheless, at the cost of sacrificed enhanced packaging and improved aesthetics. Although not explicitly detailed in this disclosure, this design iteration is also possible.

In a first control scheme, a rider makes use of a touchscreen based device such as a cellphone to wirelessly monitor using Bluetooth low energy (BLE) status of front and rear derailleur actuation switches, bicycle speed sensor and wind load sensor, and additionally monitor through a Bluetooth wireless connection road inclination, vertical and forward bicycle acceleration as relayed by a shifter control unit directly wired to front derailleur, rear derailleur, chain movement sensor and a newly disclosed seat force sensor, compiles all received inputs through an application program (App) running on the touchscreen based device, and finally commands Bluetooth wireless shifter control unit to conduct resultant shifting actions based on manual and pre-programmed operator invoked semi-automatic and fully automatic control modes.

In a second and third control schemes, a rider makes use of a touchscreen based device such as a cellphone to wirelessly monitor using Bluetooth low energy (BLE) status of front and rear derailleur actuation switches, bicycle speed sensor, wind load sensor, road inclination sensor, vertical and forward bicycle acceleration sensors, and a seat force sensor, compiles all received inputs through an application program (App) running on the touchscreen based device, and finally commands through a Bluetooth wireless connection for the second scheme and a remote control (RC) servo wireless communication for the third scheme, wireless front and rear derailleurs to conduct resultant shifting actions based on manual and pre-programmed operator invoked semi-automatic and fully automatic control modes.

BRIEF DESCRIPTION OF THE DRAWINGS

FIG. 8 is a block diagram of a comprehensive control system for a bicycle making use of the second alternate embodiment of the rear derailleur electrical actuator of the present invention.

FIG. 11A is an isometric view of the housing internals of the preferred embodiment of the rear derailleur electrical actuator of the present invention.

FIG. 11B is an isometric view of the housing cover internals of the preferred embodiment of the rear derailleur electrical actuator of the present invention.

FIG. 11C is an isometric view of the alignment and mating of the housing and housing cover of the preferred embodiment of the rear derailleur electrical actuator of the present invention.

FIG. 11D is an exploded rearward view of the preferred embodiment of the rear derailleur electrical actuator of the present invention.

FIG. 12A is an exploded frontal view of the preferred embodiment of the rear derailleur electrical actuator of the present invention.

FIG. 12B is an isometric of a partially exploded assembly view of the preferred embodiment of the rear derailleur electrical actuator of the present invention.

FIG. 13A is an exploded rearward view of the wireless remote control (RC) servo drive unit made use of by the preferred and alternate embodiments of the rear derailleur electrical actuator of the present invention.

FIG. 13B is an exploded rearward view of the digital magnetic rotary encoder assembly of the wireless remote control (RC) servo drive unit made use of by the preferred and alternate embodiments of the rear derailleur electrical actuator of the present invention.

FIG. 13C is an exploded frontal view of the digital magnetic rotary encoder assembly of the wireless remote control (RC) servo drive unit made use of by the preferred and alternate embodiments of the rear derailleur electrical actuator of the present invention.

DETAILED DESCRIPTION OF THE INVENTION

Preferred Embodiment Construction—FIGS. 1-4

Figure 1:
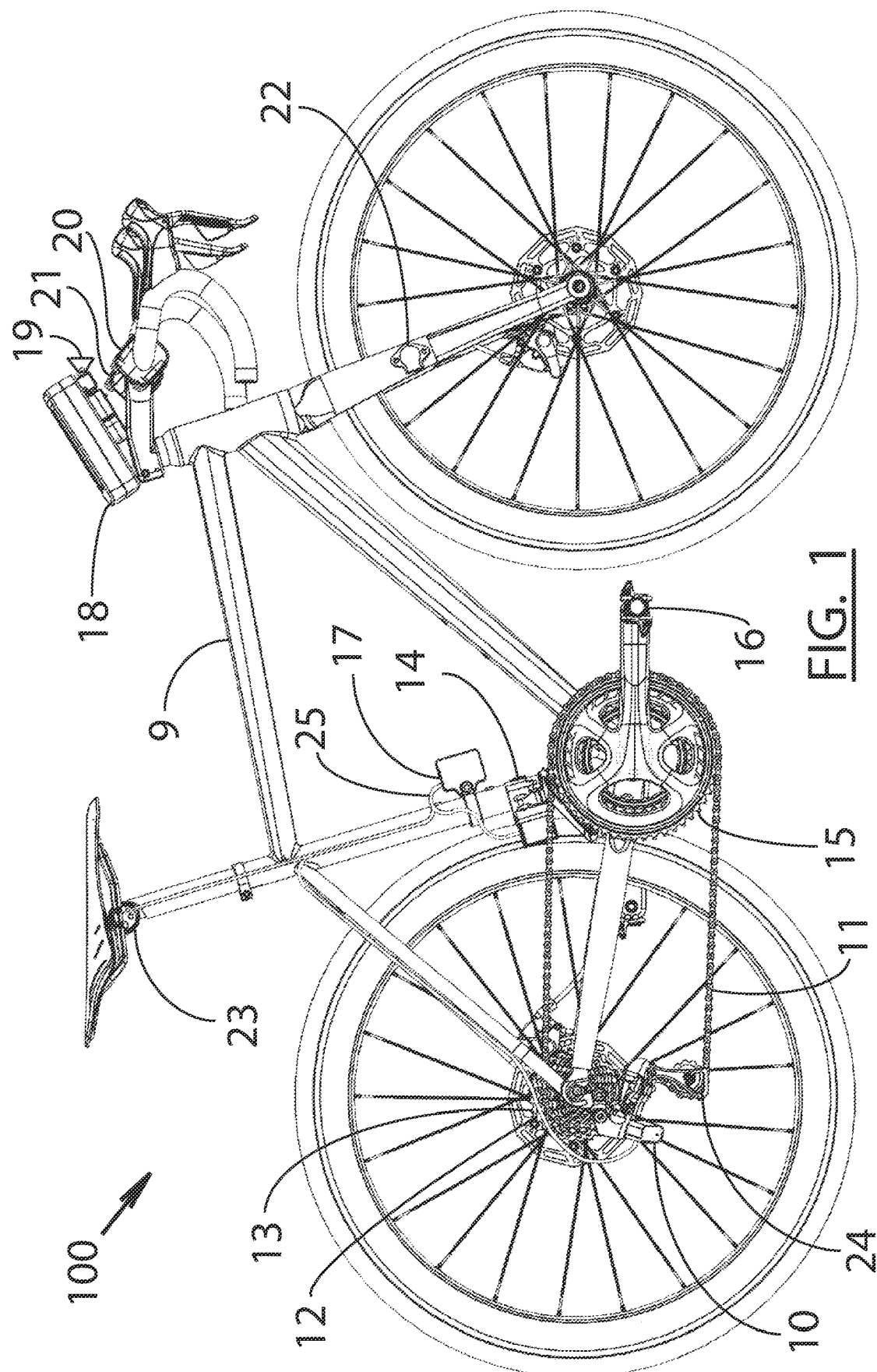
FIG. 1 is an overall view of the mechanical and electrical components of a bicycle with a rear derailleur making use of the preferred embodiment of the rear derailleur electrical actuator of the present invention.
Figure 2:
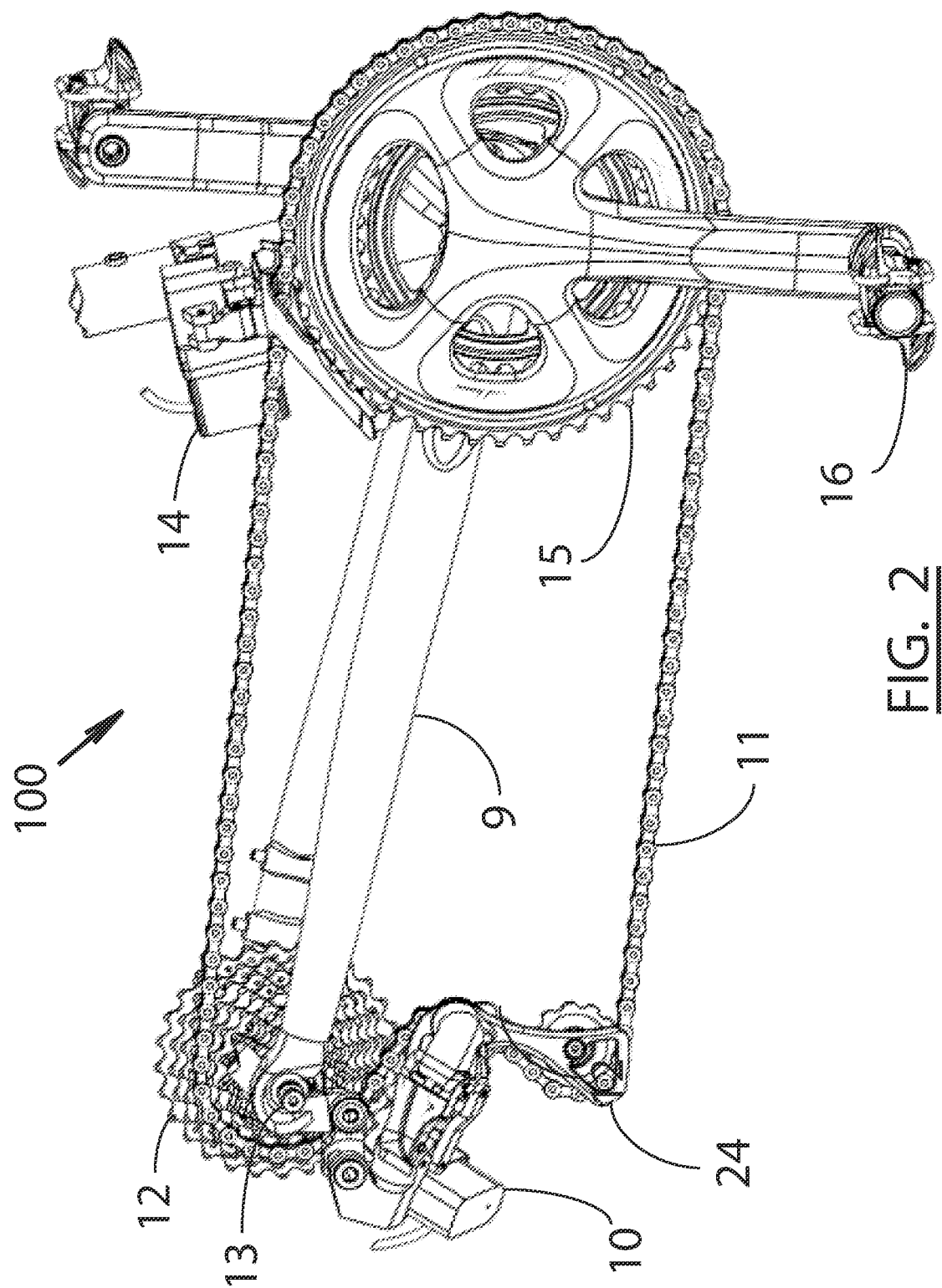
FIG. 2 is a perspective view of the powertrain of a bicycle with a rear derailleur making use of the preferred embodiment of the rear derailleur electrical actuator of the present invention.
Figure 3:
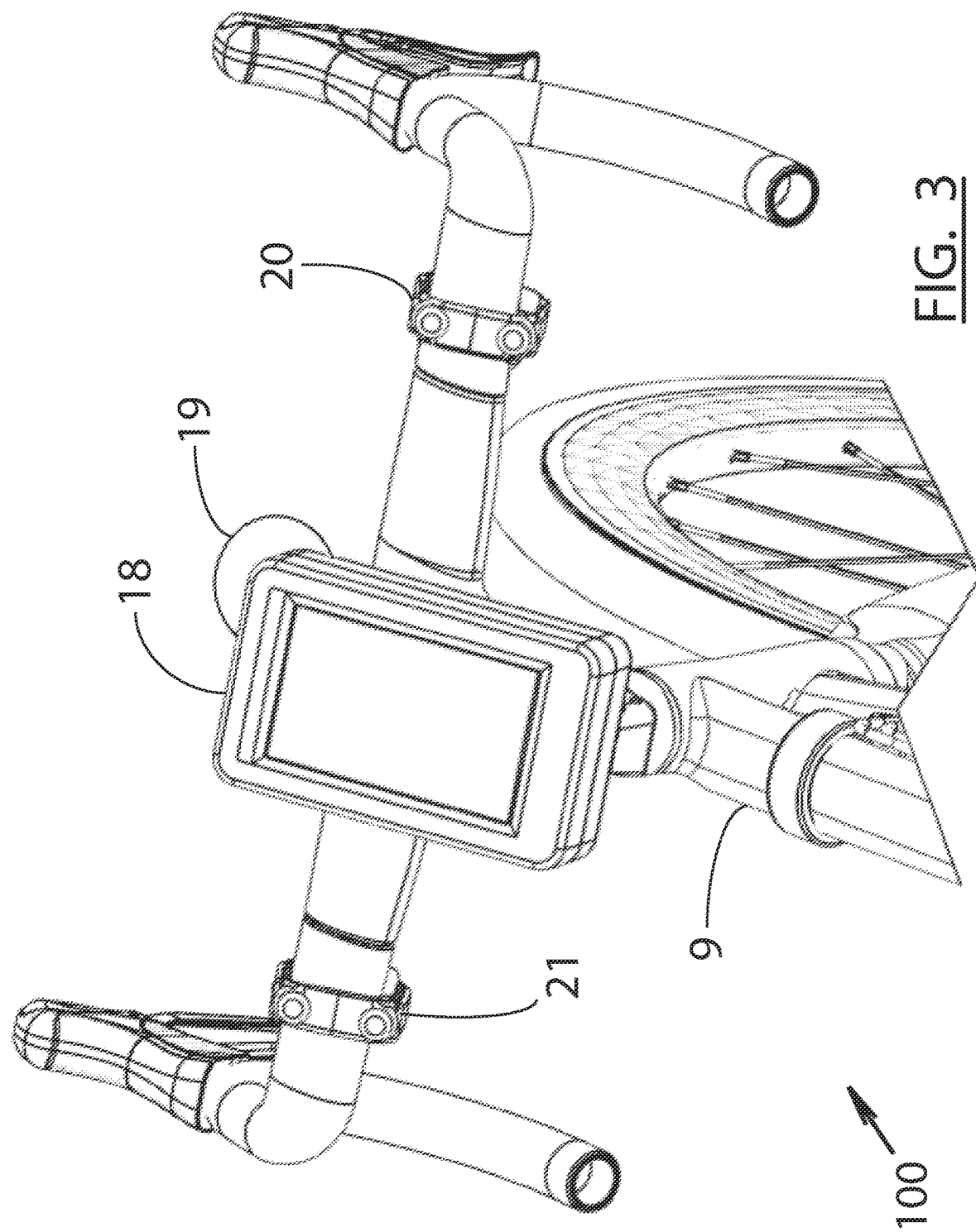
FIG. 3 is a perspective view of the operator command panel, hot wire anemometer and derailleur switches of a bicycle with a rear derailleur making use of the preferred embodiment of the rear derailleur electrical actuator of the present invention.

With reference to FIGS. 1-4, the preferred embodiment 100 of a bicycle making use of the preferred embodiment rear derailleur electrical actuator of the present invention comprises bicycle frame 9, rear derailleur 10 serving to alternate chain 11 between sprockets 12 of rear drive hub assembly 13, front derailleur 14 serving to alternate chain 11 between front sprockets assembly 15 of front pedals assembly 16, control system 17, operator command panel 18, how wire anemometer 19, rear derailleur switches 20, front derailleur switches 21, speed sensor 22, seat force sensor 23 and chain movement sensor 24. Partially shown wiring harness 25 serves to interconnect rear derailleur 10, front derailleur 14, seat force sensor 23 and chain movement sensor 25 to control system 17.

Figure 4:
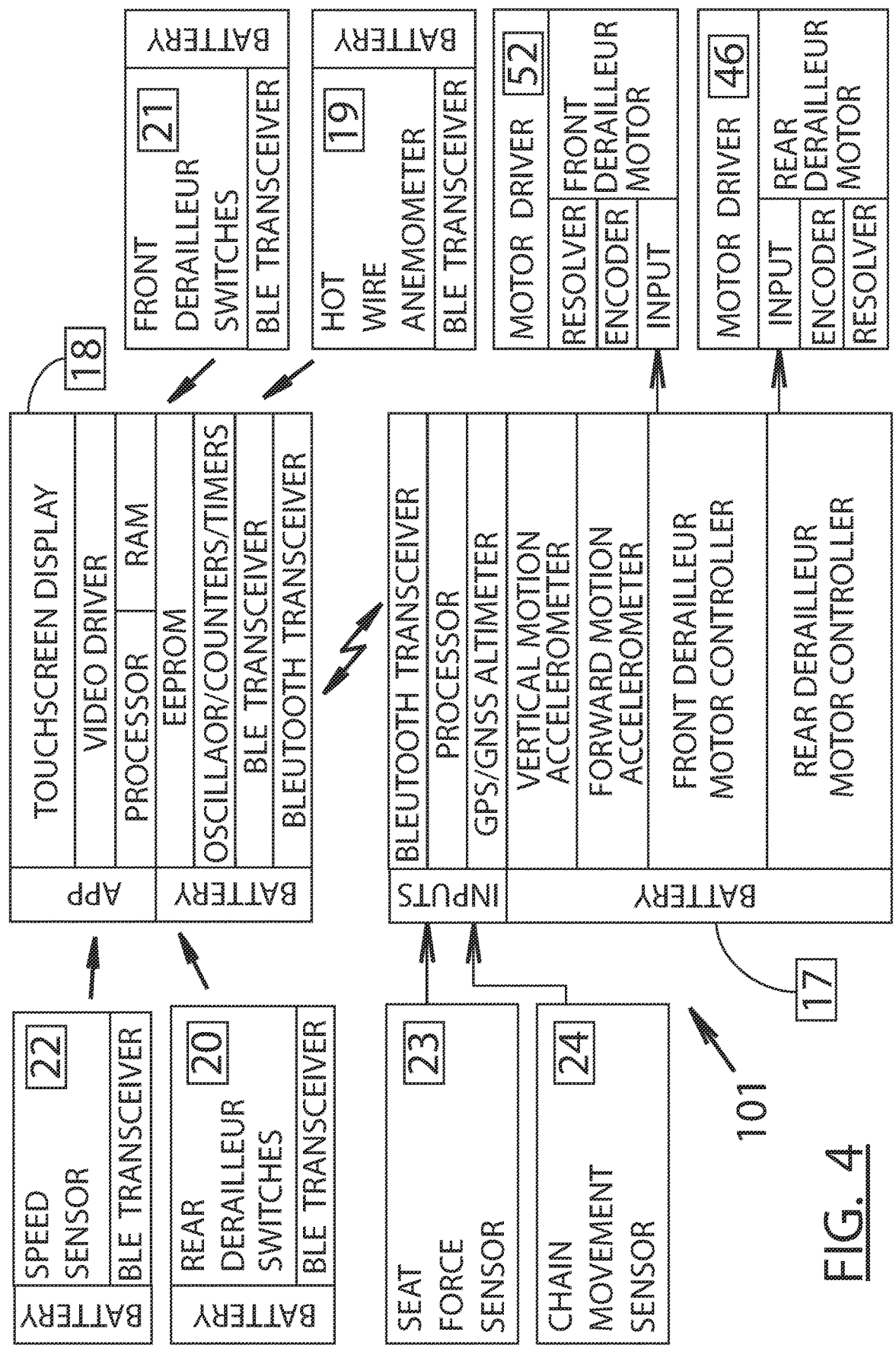
FIG. 4 is a block diagram of a comprehensive control system for a bicycle making use of the preferred embodiment of the rear derailleur electrical actuator of the present invention.

Preferred Embodiment Controls—FIG. 4

With reference to FIG. 4, the preferred embodiment 100 of a bicycle making use of controls block diagram 101 of the preferred embodiment of the rear derailleur electrical actuator of the present invention includes Control system 17 comprising steady power supply rechargeable battery pack 26, GPS/GNSS altimeter 27, vertical motion accelerometer 28, forward motion accelerometer 29, input terminals 30 serving to receive readings of seat force sensor 23 and chain movement sensor 24, and processor 31 serving to relay status of chain movement sensor 24, seat force sensor 23, forward motion accelerometer 29, vertical motion accelerometer 28, GPS/GNSS altimeter 27 to operator command panel 18 through Bluetooth transceiver 32 and receive feedback and operator commands thereof in order execute control commands to front derailleur motor controller 33 and rear derailleur motor controller 34.

Operator command panel 18 comprising battery 35, touchscreen display 36, video driver 37, controls subsection 38 comprising processor 39, random access memory (RAM) 40, electrically erasable programmable read only memory (EEPROM) 41, oscillator/counters/timers subsection 42, acting as an integral system executing application program (APP) 43 serving to evaluate readings of chain motion sensor 24, seat force sensor 23, forward motion accelerometer 29, vertical motion accelerometer 28, GPS/GNSS altimeter 27, received through Bluetooth transceiver 44, and commands from rear derailleur switches 20, front derailleur switches 21, speed readings from speed sensor 22 and wind load readings from hot wire anemometer 19 received through Bluetooth Low Energy (BLE) transceiver 45, and in turn issue controls command to control system 17 for programmed energization of front derailleur motor controller 33 and rear derailleur motor controller 34 through Bluetooth transceiver 44.

Rear derailleur motor controls subsection 46 comprises input terminals 47 serving to receive power and control signal 48 from rear derailleur motor controller 34 of control system 17, comparator/resolver 49 serving to compare rear derailleur encoder signal 50 to received control signal 48 and accordingly bias motor driver 51 serving to power motor of rear derailleur 10.

Front derailleur motor controls subsection 52 comprises input terminals 53 serving to receive power and control signal 54 from front derailleur motor controller 33 of control system 17, comparator/resolver 55 serving to compare front derailleur encoder signal 56 to received control signal 54 and accordingly bias motor driver 57 serving to power motor of front derailleur 14.

Operating as individually powered standard Bluetooth Low Energy (BLE) spectrum protocol discrete transmission units, speed sensor 22, front derailleur switches 21, rear derailleur switches 20 and hot wire anemometer 19, each comprising own battery 58 for power and own Bluetooth Low Energy (BLE) transceiver 59, serve to respectively transmit bicycle speed, operator commands, and wind speed with data thereof intercepted by BLE transceiver 45 for data processing through APP 43 of operator command panel 18.

Figure 5:
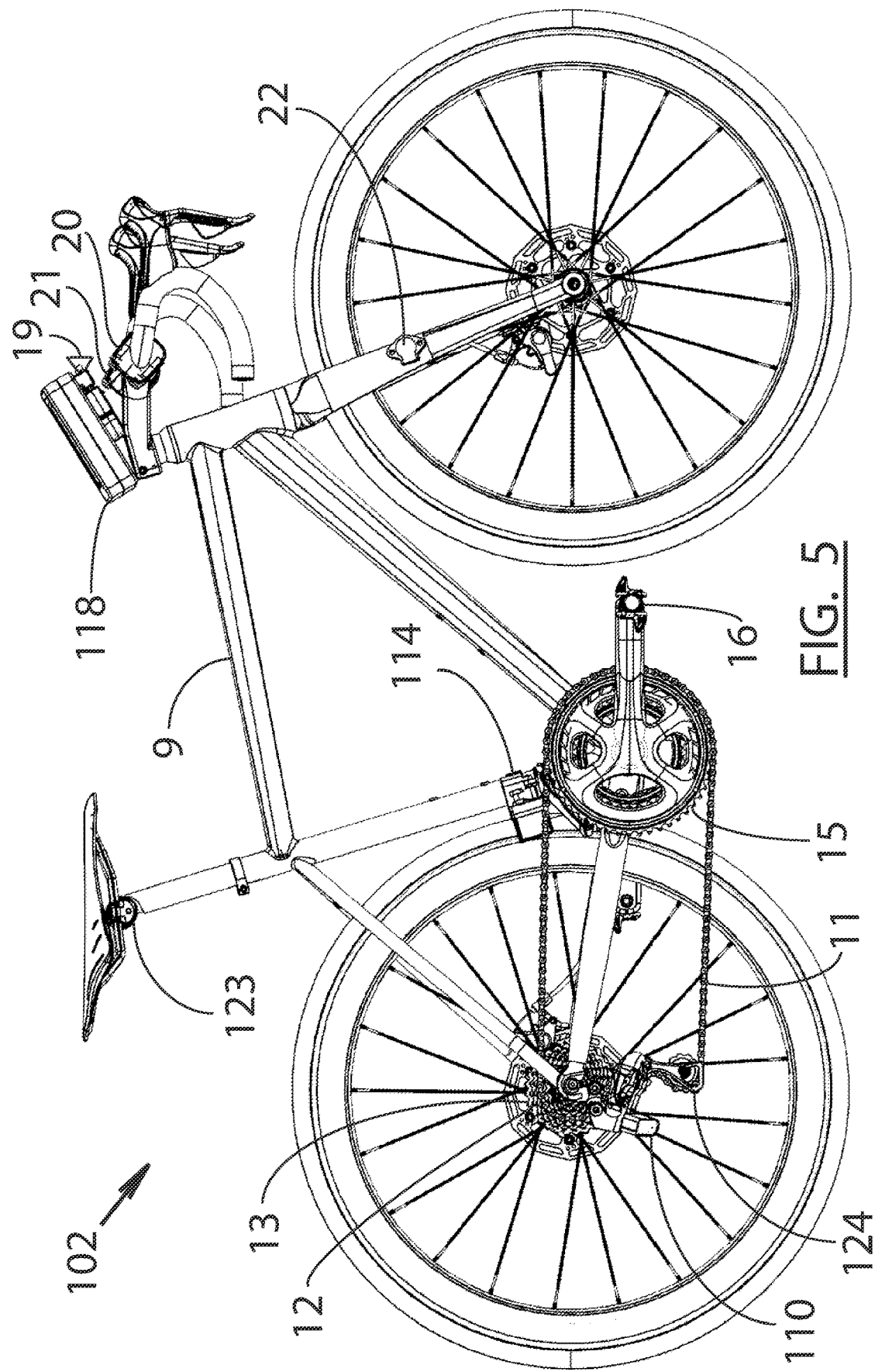
FIG. 5 is an overall view of the mechanical and electrical components of a bicycle with a rear derailleur making use of the first alternate embodiment of the rear derailleur electrical actuator of the present invention.
Figure 6:
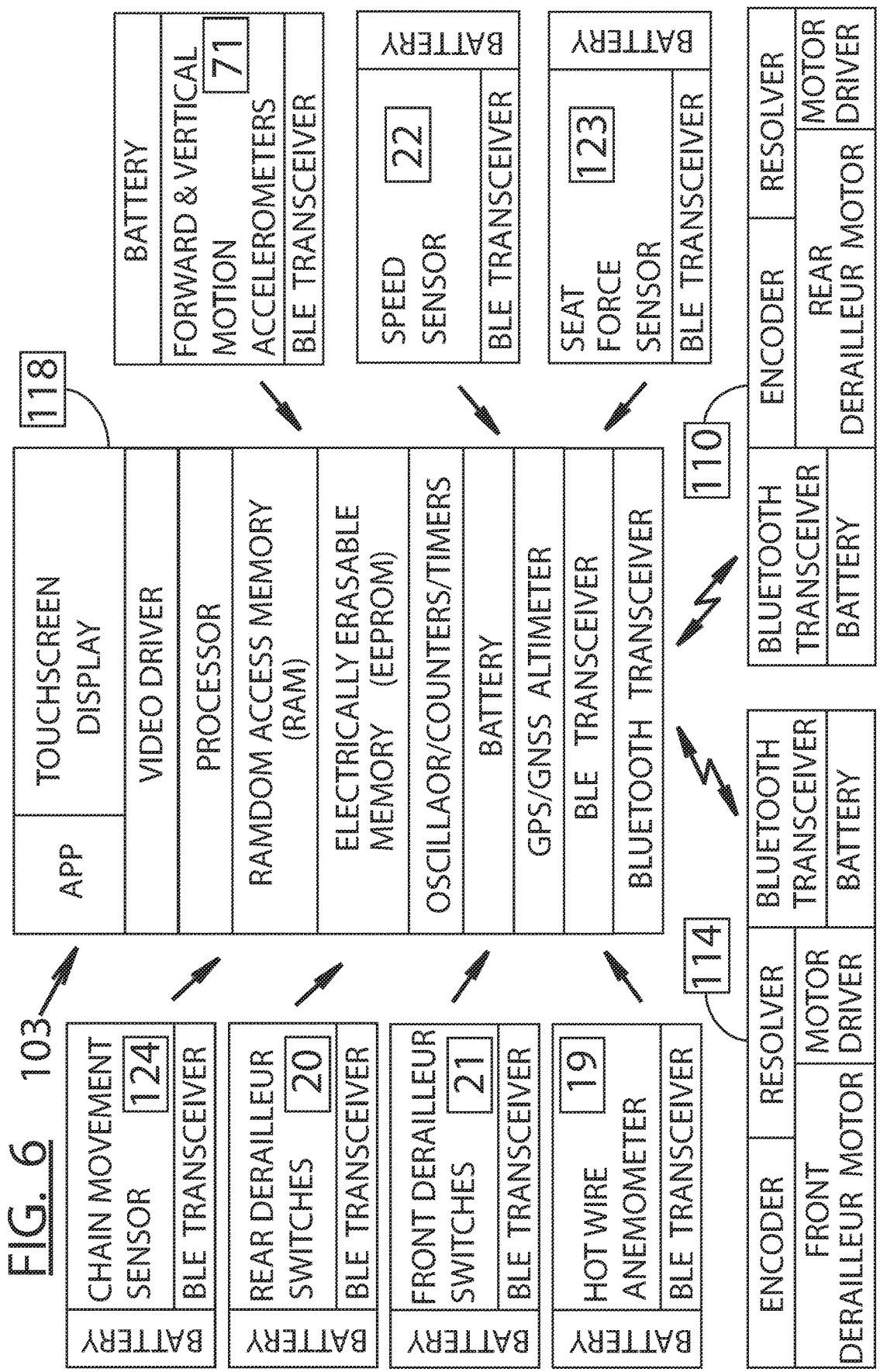
FIG. 6 is a block diagram of a comprehensive control system for a bicycle making use of the first alternate embodiment of the rear derailleur electrical actuator of the present invention.

First Alternate Embodiment Construction—FIGS. 5 & 6

With reference to FIGS. 5 & 6, the first alternate embodiment 102 of a bicycle making use of the first alternate embodiment rear derailleur electrical actuator of the present invention comprises bicycle frame 9, rear derailleur 110 serving to alternate chain 11 between sprockets 12 of rear drive hub assembly 13, front derailleur 114 serving to alternate chain 11 between front sprockets assembly 15 of front pedals assembly 16, operator command panel 118, how wire anemometer 19, rear derailleur switches 20, front derailleur switches 21, speed sensor 22, seat force sensor 123 and chain movement sensor 124.

First Alternate Embodiment Controls—FIG. 6

With reference to FIG. 6 again, the first alternate embodiment 102 of a bicycle making use of controls block diagram 103 of the first alternate embodiment rear derailleur electrical actuator of the present invention comprising control panel 118 acting as a central wireless system controller powered by battery 60, displaying system status and receiving operator commands through touchscreen display 61 based on application program (App) 62 executing on microcontroller subsection 63 including processor 64, video driver 65, random access memory (RAM) 66, electrically erasable programmable read only memory (EEPROM) 67, oscillator/counters/timers subsection 68, based on signals received from integral GPS/GNSS Altimeter 69 and through Bluetooth Low Energy (BLE) transceiver 70 wireless signals received from speed sensor 22, front derailleur switches 21, rear derailleur switches 20, hot wire anemometer 19, seat force sensor 123, chain movement sensor 124 and forward and vertical motion accelerometers 71, serves to wirelessly command each of battery powered front derailleur 114 and battery powered rear derailleur 110 through own integral Bluetooth transceiver 72.

Operating as individually powered standard Bluetooth Low Energy (BLE) spectrum protocol discrete transmission units, chain movement sensor 124, seat force sensor 123, speed sensor 22, front derailleur switches 21, rear derailleur switches 20, hot wire anemometer 19, and forward and vertical motion accelerometers 71, each comprising own battery 73 for power and own Bluetooth Low Energy (BLE) transceiver 74, serve to transmit chain movement, seat force, bicycle speed, front and rear derailleur operator commands, wind speed, and forward and vertical accelerations respectively to operator command panel 118 intercepted through BLE transceiver 70 for data processing thereof through APP 62.

Relying on wireless Bluetooth transceiver 75 serving to relay derailleur position and receive derailleur position commands from control panel 118, front derailleur 114 additionally comprises, battery 76 serving to provide power and digital magnetic rotary encoder 77 serving to relay actual derailleur position to comparator/resolver 78 used to compare actual derailleur position thereof to desired derailleur position 79 received from control panel 118 and accordingly bias motor driver 80 serving to power electrical motor of front derailleur 114.

Relying on wireless Bluetooth transceiver 81 serving to relay derailleur position and receive derailleur position commands from control panel 118, rear derailleur 110 additionally comprises, battery 82 serving to provide power and digital magnetic encoder 83 serving to relay actual derailleur position to comparator/resolver 84 used to compare actual derailleur position thereof to desired derailleur position 85 received from control panel 118 and accordingly bias motor driver 86 serving to power electrical motor of rear derailleur 110.

Figure 7:
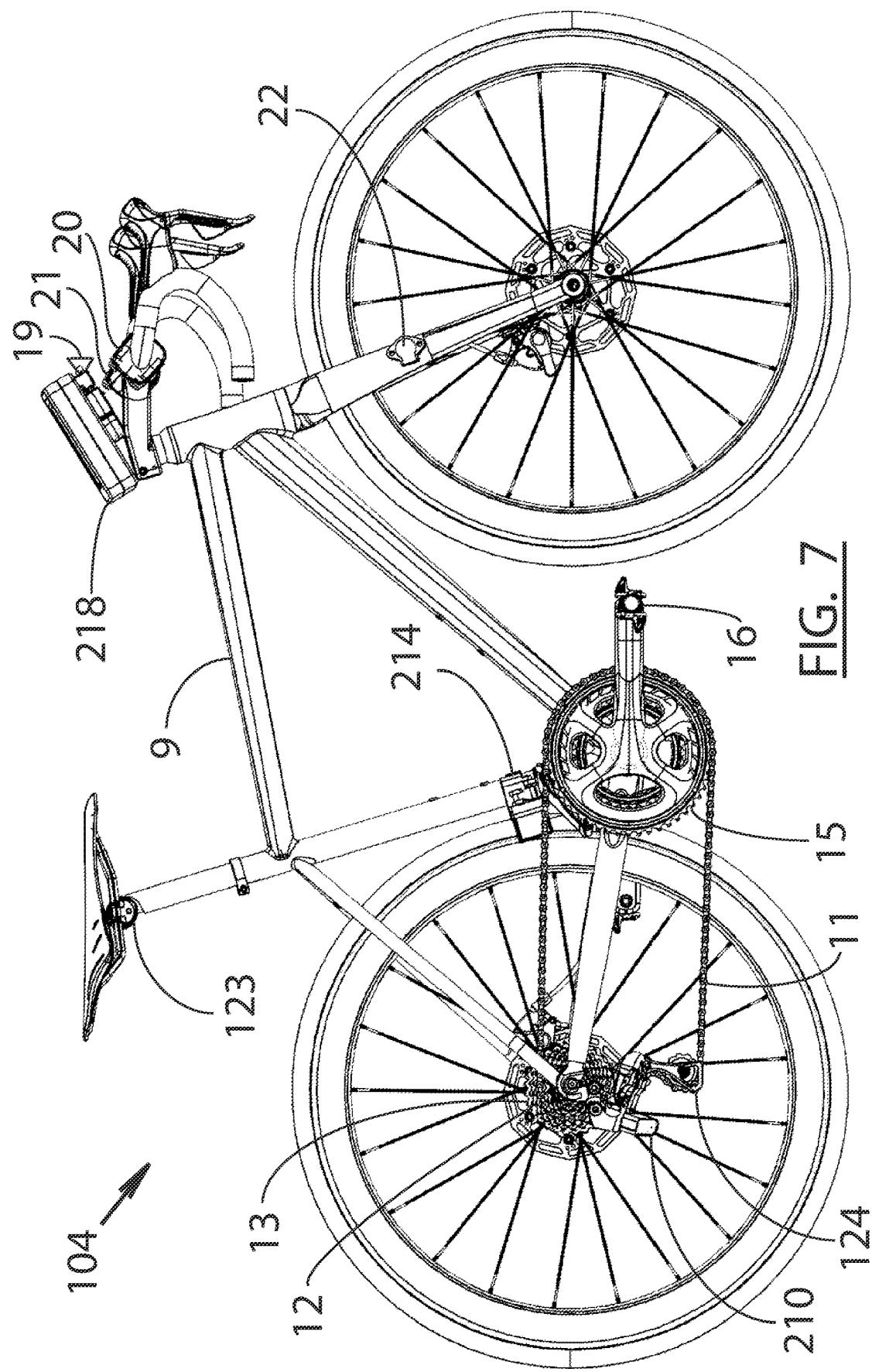
FIG. 7 is an overall view of the mechanical and electrical components of a bicycle with a rear derailleur making use of the second alternate embodiment of the rear derailleur electrical actuator of the present invention.

Second Alternate Embodiment Construction—FIGS. 7 & 8

With reference to FIGS. 7 & 8, the second alternate embodiment 104 of a bicycle making use of making use of the second alternate embodiment rear derailleur electrical actuator of the present invention comprises rear derailleur 210 serving to alternate chain 11 between sprockets 12 of rear drive hub assembly 13, front derailleur 214 serving to alternate chain 11 between front sprockets assembly 15 of front pedals assembly 16, operator command panel 218, how wire anemometer 19, rear derailleur switches 20, front derailleur switches 21, speed sensor 22, seat force sensor 123 and chain movement sensor 124.

Second Alternate Embodiment Controls—FIG. 8

With reference to FIG. 8 again, the second alternate embodiment 104 of a bicycle making use of controls block diagram 105 of the second alternate embodiment rear derailleur electrical actuator of the present invention comprising control panel 218 acting as a central wireless system controller powered by battery 87, displaying system status and receiving operator commands through touchscreen display 88 based on application program (App) 89, executing on microcontroller subsection 90 including processor 91, video driver 92, random access memory (RAM) 93, electrically erasable programmable read only memory (EEPROM) 94, oscillator/counters/timers subsection 95, based on signals received from integral GPS/GNSS Altimeter 96, and through Bluetooth Low Energy (BLE) transceiver 97 wireless signals received from chain movement sensor 124, seat force sensor 123, speed sensor 22, front derailleur switches 21, rear derailleur switches 20, hot wire anemometer 19, and forward and vertical motion accelerometers 71, serves to wirelessly command each of wireless battery powered front derailleur 214 and wireless battery powered rear derailleur 210 through standard wireless remote control (RC) servo transmitter 98.

Operating as individually powered standard Bluetooth Low Energy (BLE) spectrum protocol discrete transmission units, chain movement sensor 124, seat force sensor 123, speed sensor 22, front derailleur switches 21, rear derailleur switches 20, hot wire anemometer 19, and forward and vertical motion accelerometers 71, each comprising own battery 73 for power and own Bluetooth Low Energy (BLE) transceiver 74, serve to transmit chain movement, seat force, bicycle speed, front and rear derailleur operator commands, wind speed, and forward and vertical accelerations respectively to operator command panel 218 intercepted through BLE transceiver 97 for data processing thereof through APP 89.

Relying on standard wireless remote control (RC) servo receiver 130 serving to receive derailleur position commands from control panel 218, front derailleur 214 additionally comprises, battery 131 serving to provide power and digital magnetic encoder 132 serving to relay actual derailleur position to comparator/resolver 133 used to compare actual derailleur position thereof to desired derailleur position 134 received from control panel 218 and accordingly bias motor driver 135 serving to power electrical motor of front derailleur 214.

Relying on standard wireless remote control (RC) servo receiver 136 serving to receive derailleur position commands from control panel 218, rear derailleur 210 additionally comprises, battery 137 serving to provide power and digital magnetic encoder 138 serving to relay actual derailleur position to comparator/resolver 139 used to compare actual derailleur position thereof to desired derailleur position 140 received from control panel 218 and accordingly bias motor driver 141 serving to power electrical motor of rear derailleur 210.

Figure 9A:
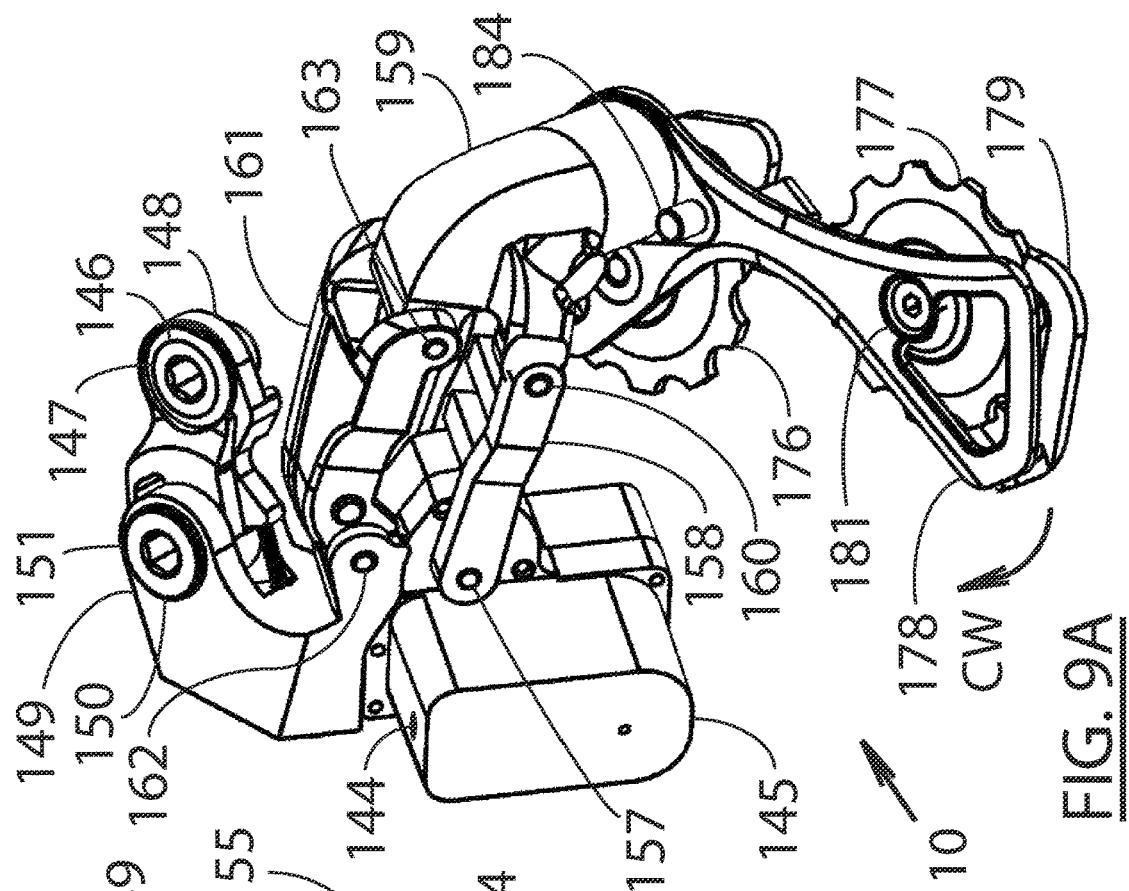
FIG. 9A is an isometric frontal view of a rear derailleur making use of the preferred embodiment of the rear derailleur electrical actuator of the present invention.
Figure 9B:
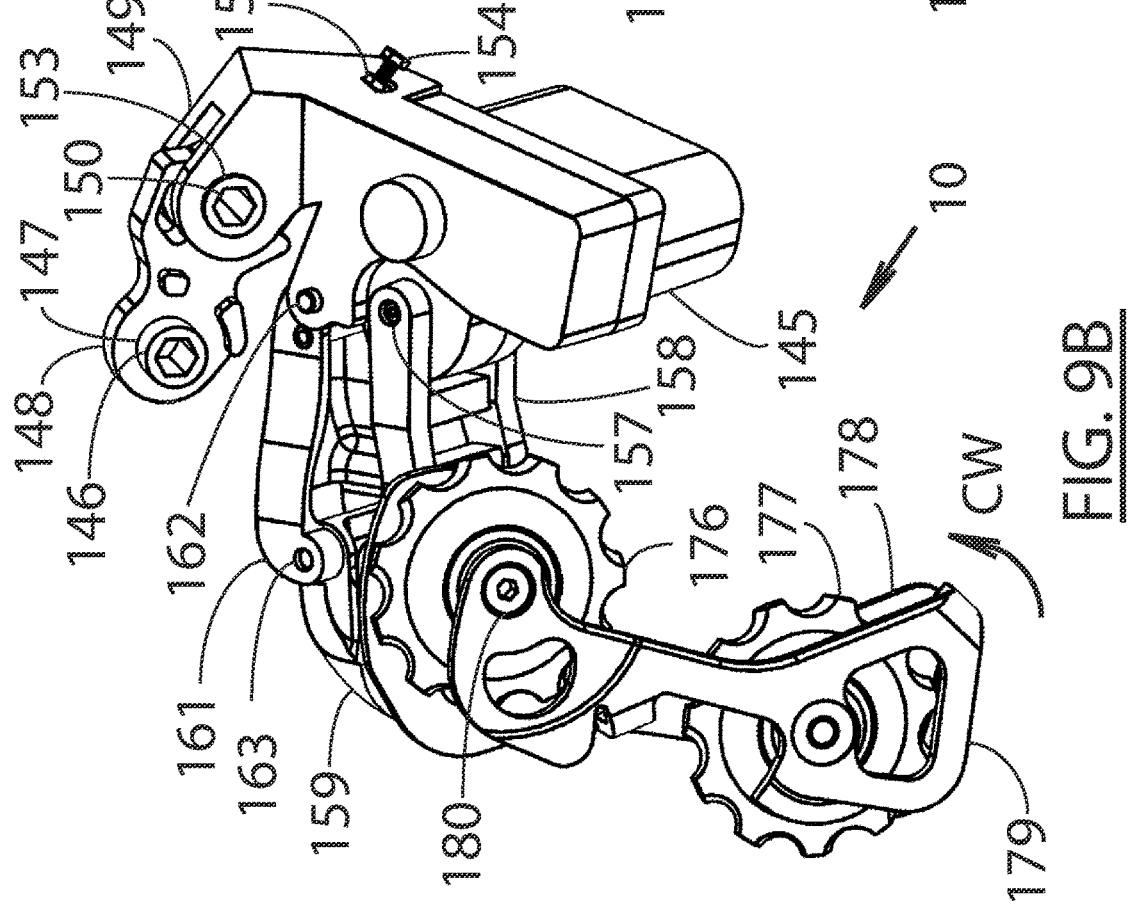
FIG. 9B is an isometric rearward view of a rear derailleur making use of the preferred embodiment of the rear derailleur electrical actuator of the present invention.
Figure 10:
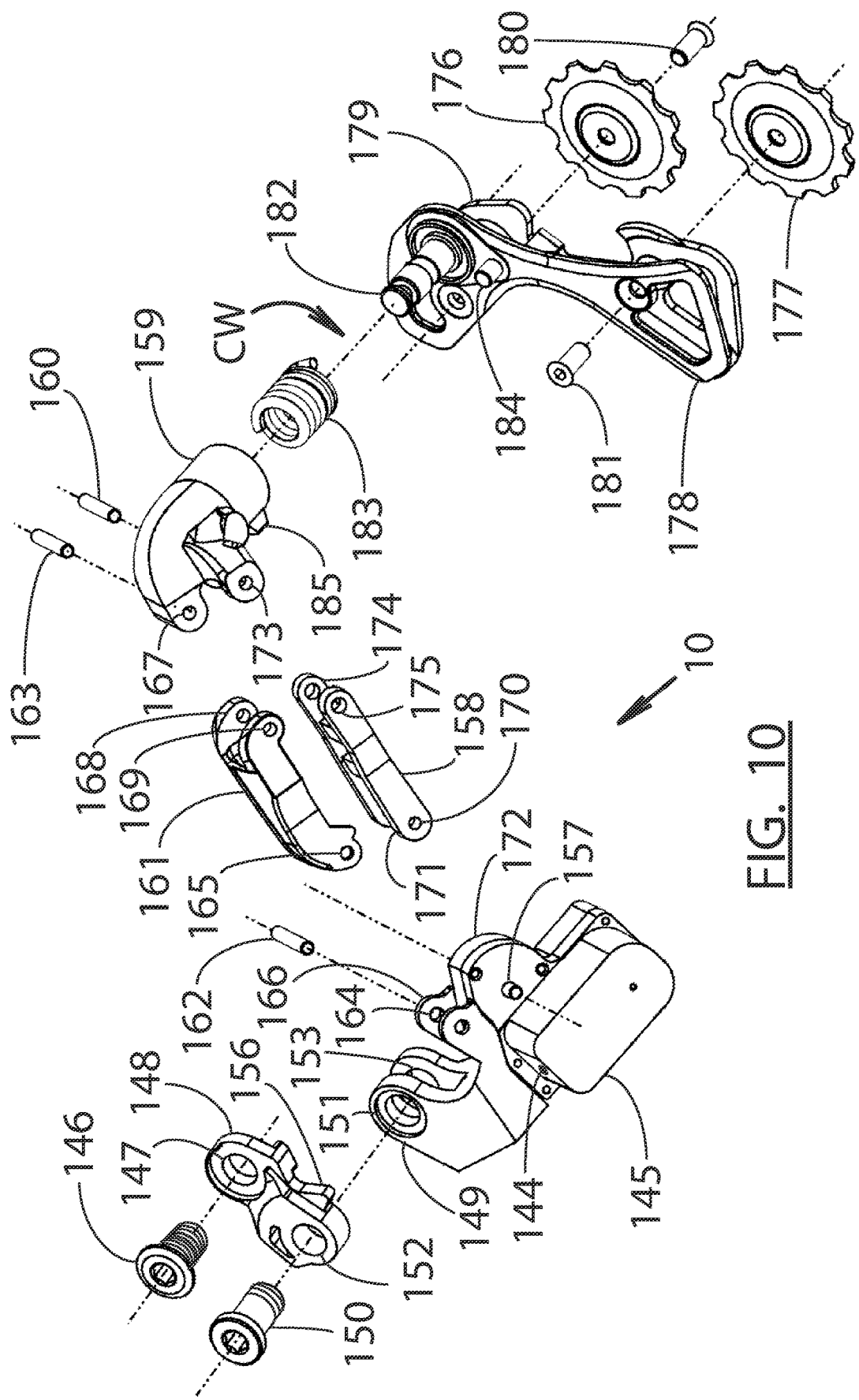
FIG. 10 is an exploded view of a rear derailleur making use of the preferred embodiment of the rear derailleur electrical actuator of the present invention.
Figure 14C:
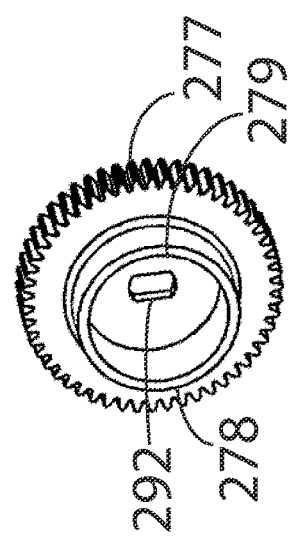
FIG. 14C is an isometric view of back of the output shaft of the wireless remote control (RC) servo drive unit made use of by the preferred and alternate embodiments of the rear derailleur electrical actuator of the present invention.
Figure 14B:
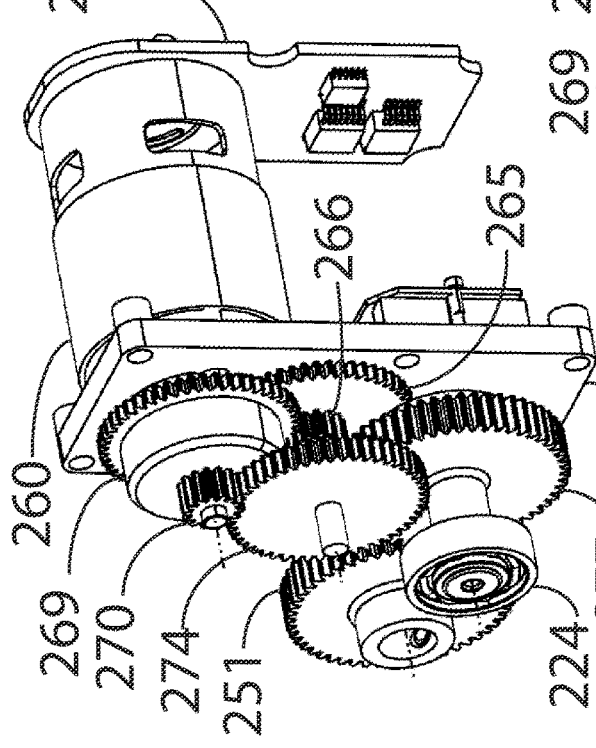
FIG. 14B is an isometric assembly view of the wireless remote control (RC) servo drive unit made use of by the preferred and alternate embodiments of the rear derailleur electrical actuator of the present invention.
Figure 14A:
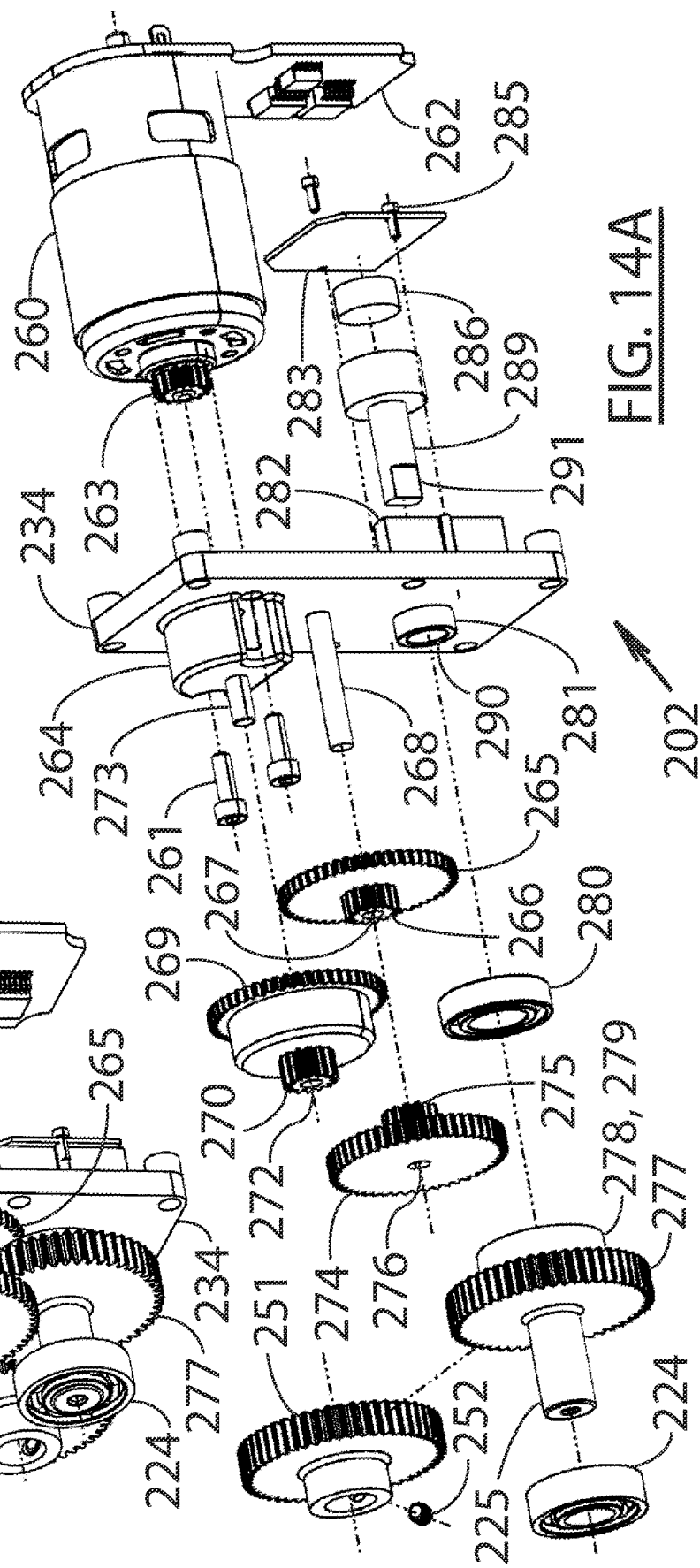
FIG. 14A is an exploded frontal view of the wireless remote control (RC) servo drive unit made use of by the preferred and alternate embodiments of the rear derailleur electrical actuator of the present invention.

Rear Derailleur Construction—FIGS. 9A, 9B & 10

With reference to frontal, rearward and exploded views depicted in FIGS. 9A, 9B & 10 respectively, the preferred embodiment rear derailleur 10 of the preferred embodiment of the bicycle rear derailleur electrical actuator of the present invention comprises three prong connector 144 delivering power and control signal 48 to drive housing assembly 145 secured to bicycle frame 9 by bolt 146 extending through slip fit bore 147 of spacer bracket 148 and secured thereto, with spacer bracket 148 further extending between bifurcating lateral extensions 149 of housing 145 with shoulder bolt 150 extending though slip bore 151 of first member of bifurcating extensions 149 of drive housing 145 through slip fit bore 152 of spacer bracket 148 and into in-line tapped hole 153 of second member of bifurcating extensions 149 thereof, thereby rotationally retaining drive housing 145 about shoulder bolt 150, and with screw 154 extending through drive housing 145 and secured thereto by locknut 155 with opposite end acting against lateral extension 156 of spacer bracket 148 to control angular relation of drive housing 145 to bicycle frame 9. With actuation of rear derailleur 10 achieved solely through rotation of actuation shaft 157 rotationally affixed to actuation link 158 at one end with opposite end thereof pivotally secured to yoke assembly 159 through axle 160 and with idler link 161 of predominantly equal length pivotally secured to drive housing 145 by means of axle 162 and to yoke assembly 159 at opposite end by means of axle 163, sheer linear translation of yoke assembly 159 is ensured through equal displacements of axle 162 from actuation shaft 157 to that of axle 160 from axle 163 thereby completing a four bar mechanism configuration with equal lengths opposing members. Accurate actuation and proper alignment of rear derailleur 10 is ensured through proper fitment of axle 162 press fit into each of two inline bores 164 of drive housing 145 and accurate slip fit thereof into bore 165 of idler link 161 with breadth thereof properly controlled for accurate fit between bifurcating banks 166 of bores 164, and with axle 163 at opposite end press fit into bore 167 of yoke assembly 159 with breadth thereof accurately fit between bifurcating banks 168 of two inline bores 169 with accurate slip fit to axle 163. Conversely, drive shaft 157 on each of two sides of housing 145 is press fit into two inline bores 170 of actuation link 158 with spacing between bifurcating banks 171 of inline bores 170 thereof properly controlled for accurate fit across lateral extension 172 of drive housing 145, and with axle 160 at opposing end press fit into bore 173 of yoke assembly 159 with breadth thereof accurately fit between bifurcating banks 174 of two inline bores 175 slip fit to axle 160 thereof. With the main objective of the linkage arrangement of rear derailleur 10 being accurate spatial placement of upper idler sprocket 176 and lower idler sprocket 177 rotationally retained between upper caging assembly plate 178 and lower caging assembly plate 179 by upper and lower shoulder screws 180 and 181 respectively, in proper relation to rear sprockets 12 of rear hub 13, while simultaneously using this sprocket arrangement as a means for chain take-up through pivot shaft 182 affixation to upper caging assembly plate 178 and thereof implementation as a rotationally secured fulcrum in accurate fitting receiving cavity of yoke assembly 159 biased in the clockwise (CW) direction by means of torsion spring 183 with pin 184 press fit into upper caging assembly plate 178 limiting rotational over-travel thereof upon reaching lateral extension stop 185 of yoke assembly 159, proper tension forcing chain 11 to remain captive to upper idler sprocket 176 permits accurate targeting thereof of individual sprocket of rear sprockets 12 of rear hub 13 through action of torsion spring 183 forcing displacement of lower sprocket 177 in the clockwise (CW) direction thereby taking up slack of chain 11 resultant from transition between various diameter sprockets.

Rear Derailleur Drive Housing Construction—FIGS. 11A-11D, 12A & 12B

With reference to FIGS. 11A-11D, 12A & 12B, the preferred embodiment of the rear derailleur electrical actuator assembly 201 of rear derailleur 10 of the present invention comprises drive housing half 221 including primary bifurcating extensions 149 for mounting and secondary bifurcating extensions 166 for pivotal retention of idler link 161 through two inline bores 164 by thereto press fit axle 162, bore 222 disposed in gearing cavity 223 for slip fit radial retention of auxiliary roller bearing 224 slip fit to intermediate shaft 225 of drive assembly 202, auxiliary gear first semi-bore 226 disposed in lateral extension 227, thereto concentric bore 228 for slip fit retention of roller bearing 229 of output shaft 157 of rear derailleur electrical actuator assembly 201, thereto concentric o'ring groove 230 for retention of o'ring 231 and thereto concentric bore 232 slip fitting sideward protrusion of output shaft 157 for rotational affixation thereof to actuation link 158 through first of two in-line bores 170. Drive housing half 221 additionally includes tapped holes 233 for mounting of base plate 234 of drive assembly 202 by screws 235 and tapped holes 236 for mounting of drive housing cover 237 by screws 238, and flat surface 239 for thereto mating flat gasket 240 serving to seal junction between drive housing half 221 and thereto mating drive housing cover 237. With reference to FIG. 11B again, drive housing cover 237 includes drive assembly cavity 241 and auxiliary gear second semi-bore 242 disposed in lateral extension 243, thereto concentric slip fit bore 244 for retention of roller bearing 245 of output shaft 157 of rear derailleur electrical actuator assembly 201, thereto concentric o'ring groove 246 for retention of o'ring 247 and close fitting bore 248 slip fitting sideward protrusion of output shaft 157 for rotational affixation thereof to actuation link 158 through second of two in-line bores 170. Drive housing cover 237 additionally includes flat surface 249 for thereto mating flat gasket 240 and through holes 250 for screws 238. Torque output of drive assembly 202 is transmitted through output gearing of drive assembly 202 to output shaft 157 through actuation of auxiliary gear 251 secured to shaft 157 by setscrew 252. With reference to FIGS. 11C and 12B again, assembly, retention and sealing of drive assembly 202 within two-piece housing of rear derailleur electrical actuator assembly 201 of the present invention comprised of drive housing half 221 and housing cover 237, is depicted through alignment of housing halves thereof, assembly and closure.

Rear Derailleur Drive Assembly Construction—FIGS. 13A-13C, 14A-14C

With reference to FIGS. 13A-13C, 14A-14C, the preferred embodiment of the rear derailleur electrical actuator assembly 201 of rear derailleur 10 of the present invention makes use of servo drive unit 202 comprising drive motor 260 secured to base plate 234 by screws 261, with terminals thereof soldered directly onto output traces of servo electronics board 262 and with output shaft thereof rotationally affixed to pinion 263 protruding through cylindrical interior cavity of lateral semi-cylindrical extension 264 of base plate 234 to engage first stage driven gear 265 rotationally affixed to smaller second stage driver gear 266 with though bore 267 thereof rotationally supported by axle 268 affixed to base plate 234. Second stage driver gear 266 engages second stage driven gear 269 rotationally affixed to smaller third stage driver gear 270 and with cylindrical hollowed out interior 271 partially supported by lateral semi-cylindrical extension 264 and through bore 272 thereof rotationally supported by axle 273 affixed to lateral semi-cylindrical extension 264 of base plate 234. Third stage driver gear 270 engages third stage driven gear 274 rotationally affixed to smaller fourth stage driver gear 275 and with through bore 276 thereof rotationally supported by axle 268 in turn driving fourth stage driven gear 277 rotationally affixed to intermediate shaft 225. Serving as the actuation member of servo drive unit 202, intermediate shaft 225 is supported on one end by bearing 224 with circular opposite end 278 thereof, extending past fourth stage driven gear 277, including bore 279 for seating of supporting roller bearing 280 with inner race affixed to close fitting supporting circular protrusion 281 of base 234. In turn, output of drive assembly 202 is transmitted to output shaft 157 of the rear derailleur electrical actuator assembly 201 of rear derailleur 10 of the present invention through engagement of fourth stage driven gear 277 to auxiliary gear 251 rotationally affixed to output shaft 157 by setscrew 252.

Rear Derailleur Position Feedback—FIGS. 13A-13C, 14A-14C

With reference to FIGS. 13A-13C, 14A-14C again, the preferred embodiment of the rear derailleur electrical actuator assembly 201 of rear derailleur 10 of the present invention embodies servo drive unit 202 making use of recently commercially available digital magnetic encoder comprising a magnetic sensor chip with digitally encoded output proportionate to orientation of overhead flux a standard bipolar magnet. With application thereof readily available in standard wireless remote control (RC) servo assembly implemented in this construction, drive assembly 202 of the preferred embodiment 201 of the rear derailleur electrical actuator assembly of the present invention comprises rearward extension 282 of base plate 234 serving as mount for magnetic encoder board 283 of magnetic encoder integrated circuit chip 284 by screws 285, and properly positioned thereto bipolar magnet 286 disposed in central cavity 287 of cylindrical stub 288 of encoder shaft 289 rotationally operable in bore 290 of circular protrusion 281 of base plate 234 and with flats 291 thereof rotationally retained into closely matching slot 292 in base of bore 279 of circular opposite end 278 of drive shaft 225 for direct sensing of rotational position thereof. For improved rotational position accuracy sensing of intermediate shaft 225, flats 291 of encoder shaft 289 are typically potted into receiving matching slot 292 of intermediate shaft 225 so that bipolar magnet 286 is rotationally locked to intermediate shaft 225 and thereby resultant readings of encoder board 283 directly correspond to position of intermediate shaft 225, and consequently thereof, notwithstanding any potential backlash, position of output shaft 157 through engagement of fourth stage driven gear 277 to auxiliary gear 251.

Figure 15B:
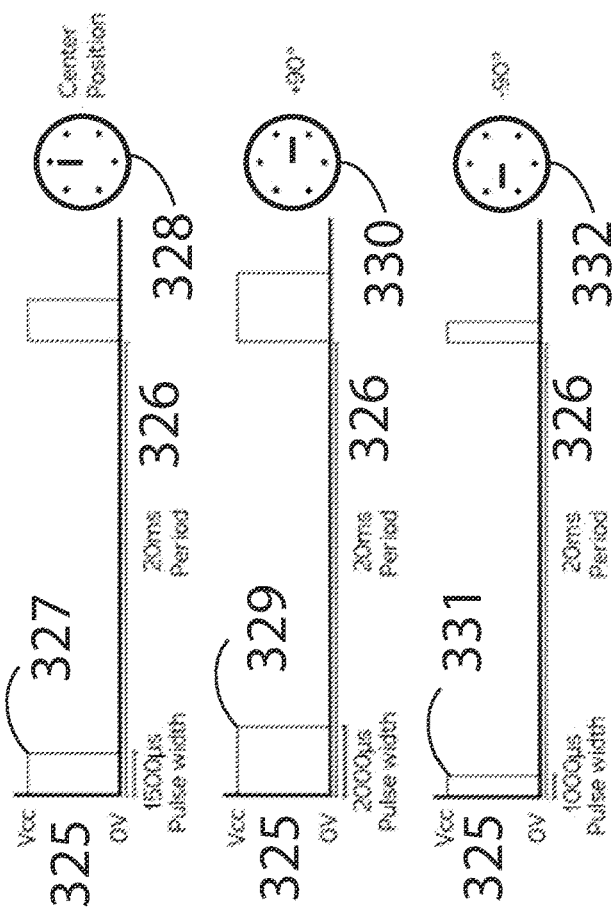
FIG. 15B is a chart depicting pulse width modulation (PWM) control of the wireless remote control (RC) servo drive unit made use of by the preferred and alternate embodiments of the rear derailleur electrical actuator of the present invention.
Figure 15A:
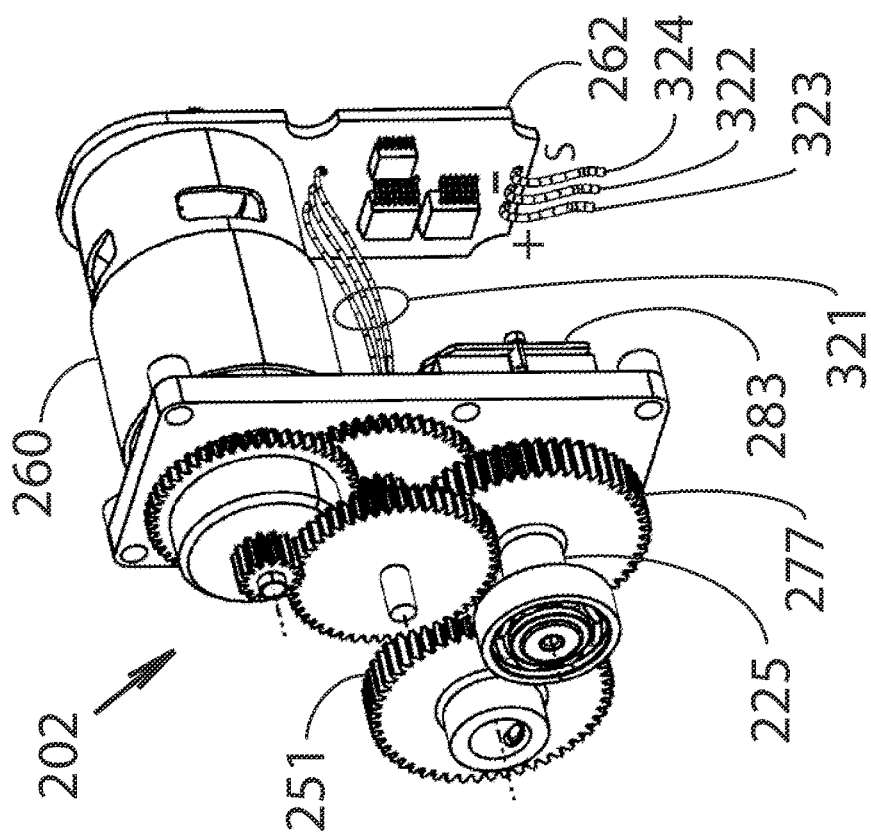
FIG. 15A is an isometric assembly view depicting positional feedback, power supply and actuation signal wiring of the wireless remote control (RC) servo drive unit made use of by the preferred and alternate embodiments of the rear derailleur electrical actuator of the present invention.

Rear Derailleur Position Feedback—FIGS. 15A & 15B

With reference to FIGS. 15A & 15B, the preferred embodiment of the rear derailleur electrical actuator assembly 201 of rear derailleur 10 of the present invention bears an actuation position in direct and linear relation to that of servo actuation unit 202 through engagement of auxiliary gear 251 permanently affixed to actuation shaft 157 of rear derailleur electrical actuator assembly 201 to fourth stage driven gear 277 permanently affixed to intermediate shaft 225 and consequentially actuation position of servo drive unit 202.

With reference to FIG. 15A again, closed loop feedback control of servo electronics board 262 is facilitated by connection thereto of output wiring 321 of digital magnetic encoder board 283 serving to relay position of intermediate shaft 225 and consequently indirectly that of output shaft 157 thereof coupled to intermediate shaft 225 through engagement of auxiliary gear 251 to fourth state driven gear 277 permanently affixed to output shaft 225, and thereby actual position of rear derailleur actuator assembly 201. Additionally, the servo control unit 202 implemented in the preferred embodiment of the rear derailleur electrical actuator assembly 201 of the present invention makes use of among many available wireless remote control (RC) servo protocols, that of pulse width modulation (PWM) typically in the 50 hertz (HZ) range with pulse width ranging from 1000 microseconds to 2000 microseconds thereof being directly linearly proportional to output position of servo output member, intermediate shaft 225 and consequentially output shaft 157 of rear derailleur electrical actuator assembly 201 of rear derailleur 10.

With the sole connection to servo electronics board 262 being three wires with power being supplied by negative wire 322 and positive wire 323, and with the third wire 324 delivering rear derailleur control signal 48 with voltage 325 thereof charted in FIG. 15B with a nominal value Vcc on the ordinate vs. time 326 on the abscissa, at typical actuation frequency of around 50 hertz (HZ) a pulse width 327 of 1500 microseconds at nominal control voltage Vcc results in servo unit 202 movement to center position of output shaft 225 as depicted in dial 328 in FIG. 15B, with pulse width 329 of 2000 microseconds commanding servo drive unit 202 to move intermediate shaft 225 to extreme clockwise position as depicted in dial 330, and with pulse width 331 of 1000 microseconds commanding servo drive unit 202 to move intermediate shaft 225 to extreme counterclockwise position as depicted in dial 332. Needing not be emphasized is that these relations are for reference only and that a direct and linear relationship exists between value of pulse width signal 48 of control signal wire 324 in microseconds to command position of servo drive unit 202 and thereby rear derailleur electrical actuator assembly 201 of rear derailleur 10.

The claims of the rear derailleur electrical actuator of the present invention are as follows:

1. A rear derailleur electrical actuator comprising,
 a) a housing including a first gearing cavity, a first lateral extension for an auxiliary spur gear,
 b) said housing further including a flat surface, a plurality of tapped holes for mounting of a closure cover,
 c) said closure cover including a second gearing cavity, a second lateral extension for said auxiliary spur gear, a flat surface with a plurality of through holes for insertion of a plurality of mounting screws to said housing,
 d) said housing flat surface further including a plurality of tapped holes for mounting of a spur gearing assembly,
 e) said spur gearing assembly including a mounting plate with a plurality of through holes for insertion of a plurality of mounting screws to said housing,
 f) said spur gearing assembly further including an electric motor with a spur gearing pinion, g) said spur gearing pinion in constant mesh with a first stage driven spur gear affixed to a second stage driver spur gear,
h) said second stage driver spur gear in constant mesh with a second stage driven spur gear affixed to a third stage driver spur gear,
i) said third stage driver spur gear in constant mesh with a third stage driven spur gear affixed to a fourth stage driver spur gear,
j) said fourth stage driver spur gear in constant mesh with a fourth stage driven spur gear,
k) said fourth stage driven spur gear in constant mesh with said auxiliary spur gear,
l) said fourth stage driven spur gear further including a rearward extension housing a magnet disposed thereof in relation to a fixed digital magnetic rotary encoder,
m) said auxiliary spur gear further affixed to an output shaft permanently affixed to an actuation link of a rear derailleur,
n) said spur gearing assembly further including a comparator electronics assembly including a motor amplifier connected to said electric motor, and
o) said comparator electronics assembly further including a position feedback input for said digital magnetic rotary encoder, a negative power terminal input, a positive power terminal input and a signal input for a pulse width modulation signal with a predefined relation to position of said magnet of said digital magnetic rotary encoder, whereby upon receiving a powering voltage differential across said positive power terminal and said negative power terminal and a pulse width modulation signal through said signal input, said comparator electronics assembly computes differential between said pulse width modulation signal and that corresponding to reading of said digital magnetic rotary encoder, biases said motor amplifier accordingly thereby actuating said electric motor to a balancing position thereof resulting in actuation of said actuation link of said rear derailleur through said output shaft through said auxiliary spur gear through said spur gearing assembly to a new position satisfying said received pulse width modulation signal.

2. The rear derailleur electrical actuator of claim 1 further including a bifurcating lateral extension with a set of in-line bores for a pivot shaft of an idler link of said rear derailleur.

3. The rear derailleur electrical actuator of claim 1 further including a bifurcating lateral extension for mounting to a frame of a bicycle.

4. The rear derailleur electrical actuator of claim 1 further including supporting bearings for said output shaft.

5. The rear derailleur electrical actuator of claim 1 further including a set of o'ring grooves for receipt of sealing o'rings for said output shaft.

6. The rear derailleur electrical actuator of claim 1 further including a sealing gasket disposed between said housing and said closure cover.

7. The rear derailleur electrical actuator of claim 1 wherein said comparator electronics assembly is directly affixed to terminals of said electric motor.

8. The rear derailleur electrical actuator of claim 1 wherein said pulse width modulation signal varies between 1000 and 2000 microseconds with a period of 20 milliseconds.

9. The rear derailleur electrical actuator of claim 1 wherein said pulse width modulation signal nominal voltage is of a fixed value between 5 volts and 10 volts.

10. The rear derailleur electrical actuator of claim 1 wherein said electric motor is a brushed dc motor.

11. The rear derailleur electrical actuator of claim 1 wherein said electric motor is a brushed coreless dc motor.

12. The rear derailleur electrical actuator of claim 1 wherein said electric motor is a brushless ac motor and said electronic comparator assembly further including a motor commutation electronics.

13. A process for controlled actuation of a bicycle rear derailleur comprising,
a) providing a bicycle rear derailleur with an actuator making use of two-piece housing with a lateral extension for an auxiliary spur gear,
b) providing said two-piece housing with a cavity for a wireless remote control (RC) servo unit acting through a spur gearing assembly for actuation of said auxiliary spur gear,
c) providing said spur gearing assembly with an electric motor with a spur gearing pinion,
d) providing said spur gearing pinion in constant mesh with a first stage driven spur gear affixed to a second stage driver spur gear,
e) providing said second stage driver spur gear in constant mesh with a second stage driven spur gear affixed to a third stage driver spur gear,
f) providing said third stage driver spur gear in constant mesh with a third stage driven spur gear affixed to a fourth stage driver spur gear,
g) providing said fourth stage driver spur gear in constant mesh with a fourth stage driven spur gear,
h) providing said fourth stage driven spur gear in constant mesh with said auxiliary spur gear,
i) providing said fourth stage driven spur gear further including a rearward extension housing a magnet disposed thereof in relation to a fixed digital magnetic rotary encoder,
j) providing said auxiliary spur gear further affixed to an output shaft permanently affixed to an actuation link of a rear derailleur,
l) providing said wireless remote control (RC) servo unit with an integral comparator electronics assembly including a motor amplifier connected to said electric motor, and
m) providing said remote control (RC) servo unit with a position feedback input for said digital magnetic rotary encoder, a negative power terminal input, a positive power terminal input and a signal input for a pulse width modulation signal with a predefined relation to position of said wireless remote control (RC) servo unit, whereby upon receiving a powering voltage differential across said positive power terminal and said negative power terminal and a pulse width modulation signal through said signal input, said comparator electronics assembly computes differential between said pulse width modulation signal and that corresponding to reading of said digital magnetic rotary encoder, biases said motor amplifier accordingly thereby actuating said electric motor to a balancing position thereof resulting in actuation of said rear derailleur actuation link through said output shaft through said auxiliary spur gear through said wireless remote control (RC) servo unit to a new position satisfying said received pulse width modulation signal.

14. The process for controlled actuation of a bicycle rear derailleur of claim 13 wherein said electric motor is a brushless ac motor and said electronic comparator assembly further including a motor commutation electronics.

15. The process for controlled actuation of a bicycle rear derailleur of claim 13 wherein said electric motor is a brushed dc motor.

16. The process for controlled actuation of a bicycle rear derailleur of claim 13 wherein said electric motor is a brushed coreless dc motor.

17. The process for controlled actuation of a bicycle rear derailleur of claim 13 further including a bifurcating lateral extension with a set of in-line bores for a pivot shaft of an idler link of said rear derailleur.

18. The process for controlled actuation of a bicycle rear derailleur of claim 13 further including a bifurcating lateral extension for mounting to a frame of a bicycle.

19. The process for controlled actuation of a bicycle rear derailleur of claim 13 wherein said pulse width modulation signal varies between 1000 and 2000 microseconds with a period of 20 milliseconds.

20. The process for controlled actuation of a bicycle rear derailleur of claim 13 wherein said pulse width modulation signal nominal voltage is of a fixed value between 5 volts and 10 volts.

\* \* \* \* \*